US007720657B1

(12) United States Patent  (10) Patent No.: US 7,720,657 B1
Gage  (45) Date of Patent: May 18, 2010

(54) DESIGN AND EXECUTION OF A TARGET SYSTEM THAT INCLUDES A COMPONENT MODEL

(75) Inventor: Stacey M. Gage, Medway, MA (US)

(73) Assignee: The MathWorks, Inc., Natick, MA (US)

(*) Notice: Subject to any disclaimer, the term of this patent is extended or adjusted under 35 U.S.C. 154(b) by 1000 days.

(21) Appl. No.: 10/678,718

(22) Filed: Oct. 3, 2003

(51) Int. Cl.
*G06G 7/48* (2006.01)
(52) U.S. Cl. ........................................... 703/8
(58) Field of Classification Search ................ 703/6, 703/8
See application file for complete search history.

(56) References Cited

OTHER PUBLICATIONS

AeroSim Blockset User's Guide, v1.01, Nov. 8, 2002, pp. 3, 4, 26, 32, 36, 41, 50, 62, 65, 89, 177.*
Marc Rauw, FDC 1.2—A Simulink Toolbox for Flight Dynamics and Control Analysis, 2nd edition, May 10, 2001, pp. iii, 11, 24, 25, 32, 57, 58, 118, 233, 235-237.*
Simulink, Dynamic System Simulation for MATLAB, User's Guide, Version 2.1, 1997, pp. 1-2, 1-3, 1-14, and 3-7.*
Marc Rauw, FDC 1.2—A Simulink Toolbox for Flight Dynamics and Control Analysis, 2nd edition, May 10, 2001, pp. 15, 143, 144.*
AeroSim Blockset User's Guide, v1.01, Nov. 8, 2002, pp. 33.*
Douglas K. Hiranaka; An Integrated, Modular Simulation System for Education and Research; 1999; California State Polytechnic State University Thesis; pp. 64-66, 82.*
AeroSim Blockset User's Guide, v1.01, Nov. 8, 2002, pp. 3-5, 126, and 163.*
David Followell, Enhancing Supportability Through Life-Cycle Definitions, 1995, Proceedings of Annual Reliability and Maintainability Symposium, pp. 402-409.*

Department of Defense "Military Standard 210C. Climatic information to determine design and test requirements for military systems and equipment" Distribution Statement A. MIL-STD-210C, Jan. 9, 1987, pp. i-xii, 1-5.
Department of Defense "Department of Defense Handbook. Global climatic data for developing military products." MIL-HDBK-310, Jun. 23, 1997.pp. ii-xii, 1-5, and 101.
Department of Defense, "Military Specification. Flying qualities of piloted airplanes." MIL-F-8785C, Nov. 5, 1980, pp. 45-60.
Department of Defense, "Department of Defense Handbook. Flying qualities of piloted aircraft." MIL-STD-1797A, Jun. 28, 1995, pp. iv-xiv, 657-666, 674-676.

* cited by examiner

*Primary Examiner*—Paul L Rodriguez
*Assistant Examiner*—Juan C Ochoa
(74) *Attorney, Agent, or Firm*—Lahive & Cockfield, LLP; Kevin J. Canning

(57) ABSTRACT

Methods and systems for the design and execution of an aerospace or aeronautic system are provided. The aerospace or aeronautic system may incorporate planetary environment models and models of equations of motion. The planetary environment models mathematically represent planetary environment specifications, such as atmosphere and wind. Atmosphere models include standard day atmosphere models and non-standard day atmosphere models, and wind models include continuous wind turbulence models and discrete wind turbulence models. The models of equations of motion include models of three-degree-of-freedom equations of motion with variable mass and models for six-degree-of-freedom equations of motion with variable mass. As a result, the present invention can design and execute a target system more accurately than the conventional system that provides only standard day planetary environment models, continuous wind turbulence models, or fixed mass equations of motion models.

19 Claims, 21 Drawing Sheets

── 430

3DoF EoM (mask) (link)
Integrate the three-degrees-of-freedom equations of motion to determine body position, velocity, attitude, and related values.

Parameters

Units: Metric (MKS)

Mass type: Custom Variable ── 431

Initial velo Fixed
Simple Variable ── 433

100

Initial body attitude:

0

Initial incidence:

0

Initial body rotation rate:

0

Initial position (x z):

[ 0 0 ]

Gravity source: External

[ OK ] [ Cancel ] [ Help ] [ Apply ]

6DoF EoM (Body Axis) (mask)

Integrate the six-degrees-of-freedom equations of motion using an Euler angle representation for the orientation of the body in space.

Parameters

Units: Metric (MKS)

Mass type: Fixed

Representation: Euler Angles  451

Initial position i[ Quaternion

[ 0 0 0 ]

453

Initial velocity in body axes [U,v,w]:

[ 0 0 0 ]

Initial Euler orientation [roll, pitch, yaw]:

[ 0 0 0 ]

Initial body rotation rates [p,q,r]:

[ 0 0 0 ]

Initial mass:

1.0

Inertia:

eye(3)

OK   Cancel   Help   Apply

*Fig. 4E*

DESIGN AND EXECUTION OF A TARGET SYSTEM THAT INCLUDES A COMPONENT MODEL

FIELD OF THE INVENTION

The present invention relates generally to block diagram execution environments and more particularly to methods and systems for the design and execution of a target system that includes a component model.

BACKGROUND OF THE INVENTION

Computer systems may include interactive software tools that provide environments for designing and executing digital models of electrical, electronic or mechanical devices prior to producing actual physical devices. The design and execution of a target system is performed on computers using the software tools, such as Simulink® and MATLAB®, both from The MathWorks Inc. of Natick, Mass.

Various classes of block diagrams describe computations that can be performed on application specific computational hardware, such as a computer, microcontroller, FPGA, and custom hardware. Classes of such block diagrams include time-based block diagrams such as those found within Simulink from the MathWorks, Inc. of Natick Mass., state-based and flow diagrams such as those found within Stateflow® from the MathWorks, Inc. and data-flow diagrams. A common characteristic among these various forms of block diagrams is that they define semantics on how to execute the diagram.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages such as Simulink from The MathWorks, Inc. Such packages provide sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

Engineers, analysts, and researchers in the aerospace and aeronautic industry are often faced with relatively small budgets when designing aerospace and aeronautic systems, such as aircraft, spacecraft, missiles, satellites, weapons, and unmanned airborne vehicles (UAVs). Computer-based modeling and execution systems are useful in the design of the aerospace and aeronautic systems, which demand high cost to design and execute real systems. Moreover, automatic code generation facilities support the implementation effort to arrive at embedded code for production and rapid prototype testing. Among aerospace and aeronautic components, a planetary environment is a key element in the design of the aerospace and aeronautic systems.

Conventional modeling and execution systems provide component models and utilities to develop and integrate aerospace and aeronautic systems which include equations of motion models and planetary environment models for atmosphere and wind. The models provided in the conventional modeling and execution systems are limited to standard day atmosphere models, continuous wind turbulence models, and fixed mass equations of motion models. For more accurate design and execution of an aerospace or aeronautic system, non-standard day atmosphere models, discrete wind turbulence models, and variable mass equations of motion models are needed.

Furthermore, in the conventional systems, it is required to replace an atmosphere model to change between atmosphere models, to replace a wind turbulence model to change between wind turbulence models, and to replace equations of motion model to change between equations of motion models. Therefore, there is also a need to conveniently change a currently incorporated atmosphere model, wind turbulence model, or equations of motion model to another atmosphere model, wind turbulence model, or equations of motion model.

SUMMARY OF THE INVENTION

The present invention provides methods and systems for the design and execution of a target system in a computer-based modeling and execution environment. The target system of the present invention incorporates models. The models include planetary environment models to take into account the effect of the planetary environment on the target system and equations of motion models to account for the flight dynamics. The planetary environment models of the present invention mathematically represent planetary environment specifications, such as atmosphere and wind.

The present invention provides multiple atmosphere models including standard day atmosphere models and non-standard day atmosphere models. The present invention provides a user interface that displays an option to select one of the atmosphere models. The user interface is provided in response to user's action, such as clicking the symbol representing the atmosphere model. The user interface of the present invention enables users to change a currently incorporated atmosphere model to another atmosphere model without removing the current atmosphere model and then adding another atmosphere model.

The present invention provides multiple wind turbulence models including continuous wind turbulence models and discrete wind turbulence models. The present invention provides a user interface that displays an option to select one of the wind turbulence models. The user interface is provided in response to user's action, such as clicking the symbol representing the wind turbulence model. The user interface of the present invention enables users to change a currently incorporated wind turbulence model to another wind turbulence model without removing the current wind turbulence model and then adding another wind turbulence model.

The present invention provides multiple equations of motion models including three-degree-of-freedom (3DoF) equations of motion models and six-degree-of-freedom (6DoF) equations of motion models. The 3DoF and 6DoF equations of motion models may provide models for equations of motion with variable mass. The variable mass includes at least one of simple variable mass in which mass changes via mass rate, and a custom variable mass in which users may specify how the mass changes. The present invention provides a user interface that displays an option to select one of the equations of motion models. The user interface of the present invention enables users to change a currently incorporated equations of motion model to another equations of motion model without removing the current equations of motion model and then adding another equations of motion model.

The user interface of the present invention may also be provided to display an option to select one of the models provided for a component, such as actuators, aerodynamics and propulsion models. For example, the user interface enables users to change a current coordinate system to another coordinate system.

In an illustrative embodiment of the present invention, a computer-based modeling and execution system is provided for the design of a target system that includes at least one component model. The system includes a model storage for storing and providing component models necessary to design the target system. The component models include non-standard day atmosphere models. The system also includes a design unit for designing the target system by utilizing the models provided by the model storage. The design unit provides a user interface to select an atmosphere model from the models in the model storage.

In another illustrative embodiment of the present invention, a computer-based modeling and execution system is provided for the design of a target system that includes at least one component model. The system includes a model storage for storing and providing component models necessary to design the target system. The component models include discrete wind turbulence models. The system also includes a design unit for designing the target system by utilizing the models provided by the model storage. The design unit provides a user interface to select a wind turbulence model from the models in the model storage.

In still another illustrative embodiment of the present invention, a computer-based modeling and execution system is provided for the design of a target system that includes at least one component model. The system includes a model storage for storing and providing component models necessary to design the target system. The component models include models for three-degree-of-freedom equations of motion with variable mass and/or six-degree-of-freedom equations of motion with variable mass. The system also includes a design unit for designing the target system by utilizing the models provided by the model storage. The design unit provides a user interface to select one of the models for equations of motion with variable mass provided by the model storage.

In yet still another illustrative embodiment of the present invention, a computer-readable medium holding instructions executable in a computer for the design of a target system in which a planetary environment is an element. Planetary environment models are provided to design the target system wherein the planetary environment models include non-standard day atmosphere models. A user interface is provided to incorporate an atmosphere model into the target system by selecting one of the atmosphere models including non-standard day atmosphere models.

In yet still another illustrative embodiment of the present invention, a computer-readable medium holding instructions executable in a computer for the design of a target system in which a planetary environment is an element. Planetary environment models are provided to design the target system wherein the planetary environment models include discrete wind turbulence models. A user interface is provided to incorporate a wind turbulence model into the target system by selecting one of the wind turbulence models including discrete wind turbulence models.

In yet still another illustrative embodiment of the present invention, a computer-readable medium holding instructions executable in a computer for the design of a target system that includes at least one component model. The component model includes the models for three-degree-of-freedom equations of motion with variable mass and/or six-degree-of-freedom equations of motion with variable mass. A user interface is provided to incorporate one of the models for equations of motion with variable mass into the target system by selecting one of the models for equations of motion with variable mass.

By providing standard day atmosphere models and non-standard day atmosphere models, continuous wind turbulence models and discrete wind turbulence models, and models of equations of motion with variable mass, the present invention can design and execute a target system more accurately than the conventional system that provides only standard atmosphere models, continuous wind turbulence models, and fixed mass equations of motion. The present invention enables users to select an atmosphere model conveniently in a user interface that provides an option to select one of atmosphere models. In addition, the present invention also enables users to select a wind turbulence model conveniently in a user interface that provides an option to select one of wind turbulence models. Moreover, the present invention further enables users to select equations of motion model conveniently in a user interface that provides an option to select one of multiple equations of motion models.

BRIEF DESCRIPTION OF THE DRAWINGS

FIG. 4C is a computer display showing an exemplary graphical user interface provided in response to the clicking of the equations of motion model (3DoF);

FIGS. 4D-4E show a computer display showing an exemplary graphical user interface provided in response to the clicking of the equations of motion model (6DoF) depicted in FIG. 3A;

DETAILED DESCRIPTION

The illustrative embodiment of the present invention concerns a computer-based modeling and execution system for the design and execution of a target system. The system provides models that are incorporated into the target system to mathematically represent a portion or all of the target system. The models provided in the illustrative embodiment of the present invention include aerospace and aeronautic models that are useful in design and execution the target system. The aerospace and aeronautic models may include planetary environmental models, such as atmosphere models and wind models. The atmosphere models include standard atmosphere models and non-standard day atmosphere models. The wind models include continuous wind turbulence models and discrete wind turbulence models. The aerospace and aeronautic models may also include models of three-degree-of-freedom equations of motion with fixed or variable mass and models of six-degree-of-freedom equations of motion with fixed or variable mass. The models are represented by symbols or icons, such as blocks, with the indication of an external port or ports that can be of input or output type in the illustrative embodiment of the present invention.

The illustrative embodiment of the present invention provides a user interface to enter the parameters of the atmosphere model incorporated into the target system. The user interface is provided in response to an action taken by users who select the atmosphere model. The user interface provides an option to select one of the multiple atmosphere models including standard day atmosphere models and non-standard day atmosphere models. The user interface enables users to change an atmosphere model to another atmosphere model without replacing the current atmosphere model.

The illustrative embodiment of the present invention provides a user interface to enter the parameters of the wind turbulence model incorporated into the target system. The user interface is provided in response to an action taken by users who select the wind turbulence model. The user interface provides an option to select one of the multiple wind turbulence models including continuous wind turbulence models and discrete wind turbulence models. The user interface enables users to change a wind turbulence model to another wind turbulence model without replacing the current wind turbulence model.

Figure 1A:
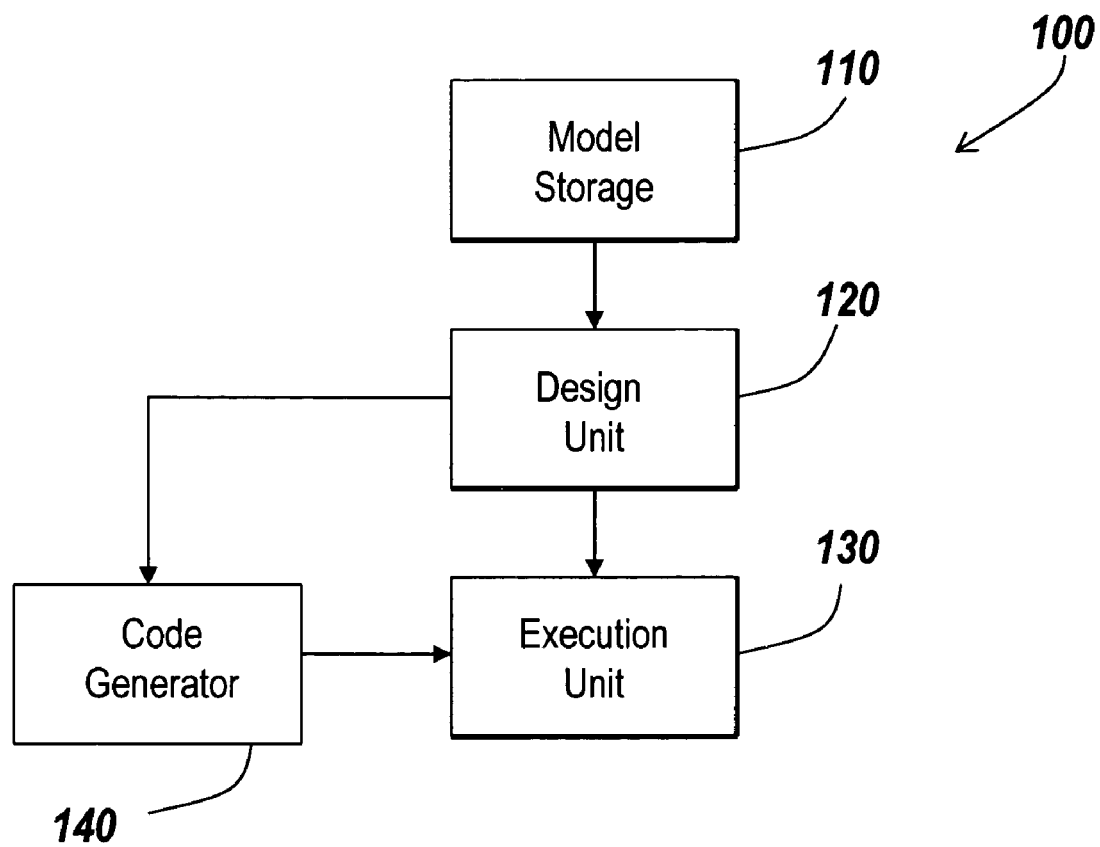
FIG. 1A is a block diagram representation of an exemplary system for modeling and execution an aerospace or aeronautic system in an illustrative embodiment of the present invention.

FIG. 1A is a block diagram representation depicting an exemplary system 100 suitable for practicing an illustrative embodiment of the present invention. The system 100 includes a model storage 110, a design unit 120, an execution unit 130 and a code generator 140. The model storage 110 contains models for the design and execution of aerospace and aeronautic systems, such as aircraft, spacecraft, missiles, satellites, weapons, and unmanned airborne vehicles (UAVs). One of skill in the art will appreciate that the aerospace and aeronautic systems are illustrative target systems and the target systems include any systems that incorporate planetary environment models in the design and execution of the systems, such as climate prediction systems.

The model storage 110 provides aerospace and aeronautic component models to the design unit 120 and the execution unit 130 that incorporate the component models into the aerospace and aeronautic systems. The model storage 110 includes planetary environment models for gravity, atmosphere, wind, etc. The planetary environment models are essential elements in design and execution aerospace and aeronautic systems. The models provided from the model storage 110 are used in the design unit 120 to create a new model of aerospace and aeronautic systems. The model storage 110 may also provides models of complete aerospace and aeronautic systems. The models of the complete aerospace and aeronautic systems may be customized in the design unit 120 to a particular aerospace or aeronautic system. The aerospace and aeronautic system created or customized in the system level design unit 120 using the models in the model storage 110 is executed in the execution unit 130 and the result of the execution can be analyzed to refine the design of the aerospace and aeronautic systems.

The models provided from the model storage 110 may be represented in symbols or icons, such as blocks, with the indication of an external port or ports that can be of input or output type. These symbols can be incorporated directly into the aerospace and aeronautic systems designed and executed in the design unit 120 and the execution unit 130, respectively. One of skill in the art will appreciate that the models provided from the model storage 110 can be represented in graphical symbols or textual symbols.

An illustrative embodiment of the model storage 110 can be found in the Aerospace Blockset, from The MathWorks, Inc. of Natick, Mass. The Aerospace Blockset provides models and utilities for the development and integration of aerospace and aeronautic systems and sub-system models for the aerospace and aeronautic systems. One of skill in the art will appreciate that the Aerospace Blockset is an illustrative embodiment of the present invention and the model storage 110 of the present invention is not limited to the Aerospace Blockset, and rather may include AeroSim Blockset, from Unmanned Dynamics of Hoover River, Oreg., Aerospace Vehicle Library, from MDS Software of Santa Ana, Calif., Aerospace Toolbox, from Miltec of Huntsville, Ala., and Aerospace Library, from National Instruments of Austin, Tex. The Aerospace Blockset operates in Simulink, from The MathWorks, Inc. of Natick, Mass., which provides an interactive tool for designing, executing, synthesizing, and analyzing aerospace and aeronautic systems. Simulink integrates seamlessly with MATLAB, from The MathWorks, Inc. of Natick, Mass., providing immediate access to analysis and design tools.

The models provided from the model storage 110 can be written in M-code, C-code, FORTRAN, or any other code. If the models are written in a different code as the code implementing the design unit 120 and the execution unit 130, the models are compiled to be executed in the design unit 120 and the execution unit 130. The Aerospace Blockset can be built on native Simulink blocks or S-functions which enable each of the models to operate in the Simulink environment model. S-functions written in C-code, for example, are compiled using the MEX command in MATLAB to make a file that is executable in the Simulink environment.

The code generator 140 generates customizable C-code directly from the block diagrams of the models designed in the design unit 120 to be executed in the execution unit 130. By automatically generating C-code, the code generator 140 enables rapid prototyping, hardware-in-the-loop simulations, and desktop rapid simulation of the models designed in the design unit 120. The code generator 140 may generate efficient C-code for embedded systems applications. One of skill in the art will appreciate that C-code is an illustrative code that is generated in the code generator 140 and the code generator 140 may generate different code for the models, such as ADA. Real-Time Workshop® from The MathWorks, Inc. of Natick, Mass., is an example of the code generator 140.

Figure 1B:
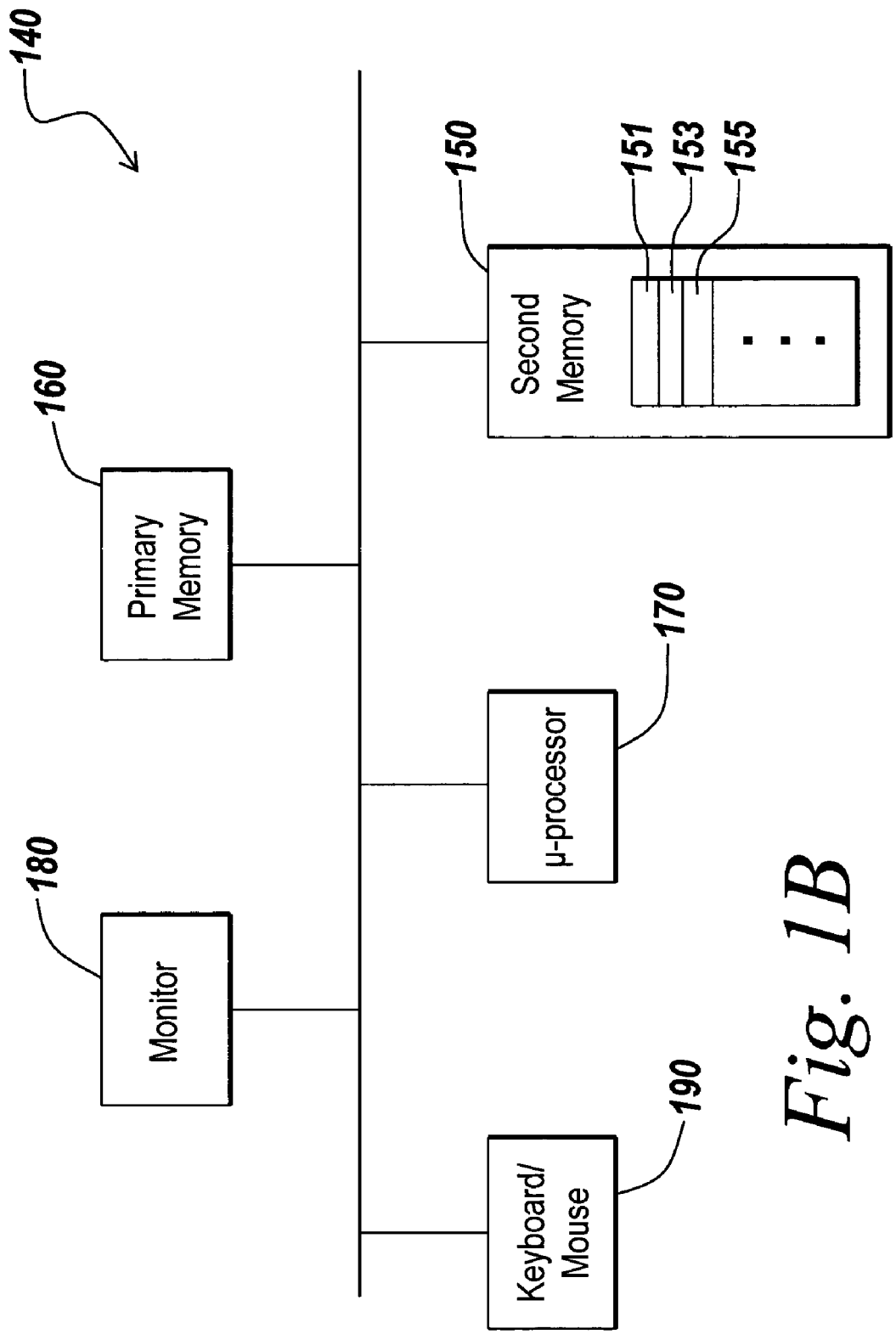
FIG. 1B is a block diagram representation of an exemplary computer system suitable for practicing the illustrative embodiment of the present invention depicted in FIG. 1A.

FIG. 1B is a block diagram representation of a computer system suitable for practicing the illustrative embodiment of the present invention depicted in FIG. 1A. The computer system 140 includes a secondary memory 150, a primary memory 160, a µ-processor 170, a monitor 180 and a keyboard/mouse 190. The µ-processor 170 controls each component of the computer system 140 to run the software tools for modeling and execution an aerospace and aeronautic system properly. The computer system 140 receives through the keyboard/mouse 190 data necessary for modeling and execution the aerospace and aeronautic system, such as input data for the type of the aerospace and aeronautic system. The computer system 140 displays in the monitor 180 the result of modeling and execution the aerospace and aeronautic system. The primary memory 160 fetches from the secondary memory 150 and provides to the g-processor 170 the codes that need to be accessed quickly by the µ-processor 170 to operate the computer system and to run the modeling and execution system. The secondary memory 150 usually contains software tools for applications. The secondary memory 150 include, in particular, codes 151 for the model storage, codes 153 for the design and execution of the aerospace and aeronautic system, codes 155 for the analysis and refining of the design and execution.

Simulink, from The MathWorks, Inc. of Natick, Mass., provides codes for users to design a block diagram of aerospace and aeronautic systems, execute the systems' behavior, analyze their performance, and refine the design. Simulink allows users to design aerospace and aeronautic systems through a user-interface that allows drafting block diagram models of the aerospace and aeronautic systems. All of the model blocks in the model storage 110 are available to users when the users are building the block diagram of the aerospace and aeronautic systems. Individual users may be able to customize this model block e.g. by (a) reorganizing blocks in some custom format, (b) deleting blocks they do not use, and (c) adding custom blocks they have designed. The blocks may be dragged through some human-machine interface (such as a mouse or keyboard) from the model storage 110 on to the window (i.e., model canvas). Simulink includes a block diagram editor that allows users to perform such actions as draw, edit, annotate, save, and print out block diagram representations of aerospace and aeronautic systems. The block diagram editor is a graphical user interface (GUI) component that allows drafting of block diagram models by users. In Simulink, there is also a textual interface with a set of commands that allow interaction with the graphical editor. Using this textual interface, users may write special scripts that perform automatic editing operations on the block diagram. Simulink also allows users to execute the designed aerospace and aeronautic systems to determine the behavior of the systems. Simulink includes a block diagram execution engine that carries out the task of compiling and linking the block diagram to produce an "in-memory executable" version of the model that is used for generating code and/or executing a block diagram model. The underlying numerical representations of models including data type, precision and data vectorization of the models are automatically derived from the context of their use.

Figure 2A:
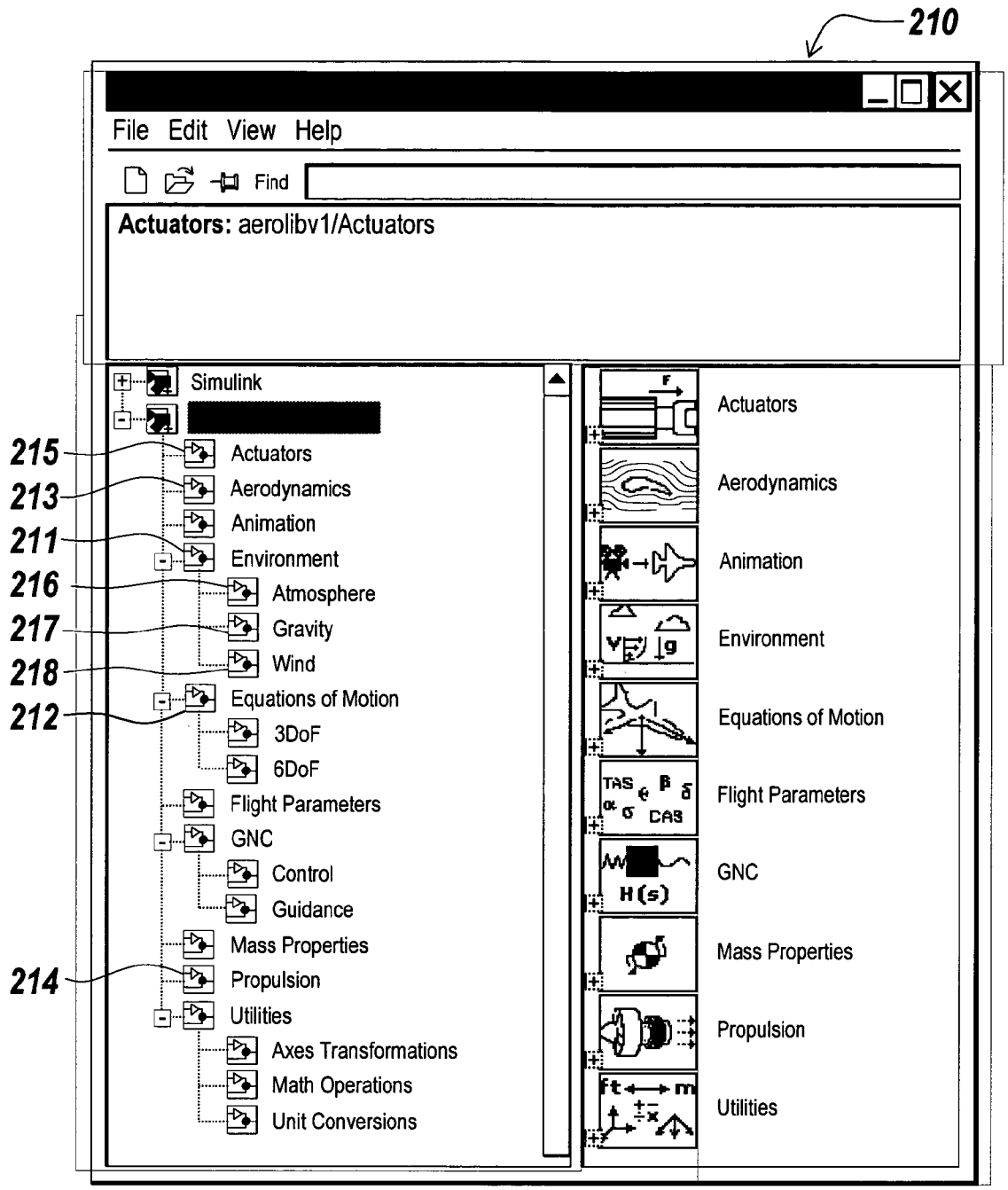
FIG. 2A is an exemplary computer display showing the categories of aerospace and aeronautic component models provided from the model storage depicted in FIG. 1A.

FIG. 2A is an exemplary computer display 210 showing the categories of aerospace and aeronautic component models provided from the model storage 110 in the illustrative embodiment of the present invention. The models provided from the model storage 110 are used in the development of aerospace or aeronautic system and classified into categories according to the functions that the models perform. The models are categorized into planetary environment models 211, equations of motion models 212, aerodynamics models 213, propulsion models 214, actuator models 215, etc. The planetary environment models 211 include atmosphere models 216, wind models 218, gravity models 217. The atmosphere models and wind models are described below in more detail with reference to FIGS. 2B and 2C, respectively.

Figure 2B:
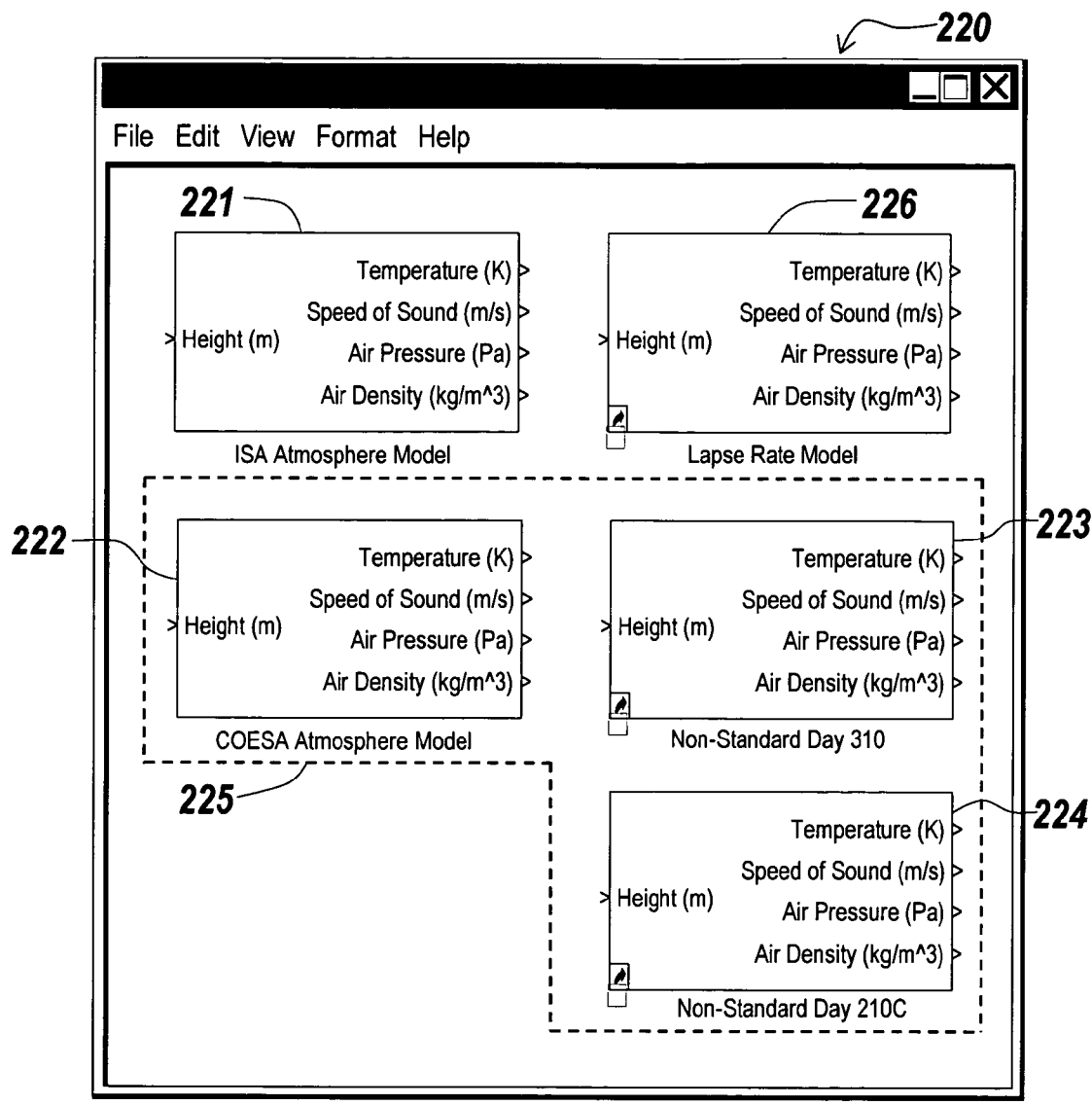
FIG. 2B is an exemplary computer display showing the atmosphere models provided from the model storage depicted in FIG. 1A.

FIG. 2B is an exemplary computer display 220 showing the atmosphere models belonging to the category of planetary environment models 211 in the illustrative embodiment of the present invention. The atmosphere models are represented by blocks in the illustrative embodiment of the present invention. One of skill in the art will appreciate that the atmosphere models can be represented by any other symbols or icons. Each block of the atmosphere models has an input, Height, and four outputs including Temperature, Speed of Sound, Air Pressure and Air Density. The atmosphere models include an-International Standard Atmosphere (ISA) atmosphere model 221, a Committee on Extension to the Standard Atmosphere (COESA) U.S. atmosphere model 222, a Non-Standard Day 310 atmosphere model 223, a Non-Standard Day 210C atmosphere model 224, and a Lapse Rate model 226. The ISA atmosphere model 221 and COESA atmosphere model 222 represent a standard day atmosphere and Non-Standard Day 310 atmosphere model 223 and Non-Standard Day 210C atmosphere model 224 represent a non-standard day atmosphere. In the illustrative embodiment of the present invention, the non-standard day atmosphere includes any atmosphere other than the standard atmosphere.

The ISA atmosphere model 221 implements the mathematical representation of the international standard atmosphere values for absolute temperature, pressure, density, and speed of sound for the input geopotential altitude. The COESA U.S. atmosphere model 222 implements the mathematical representation of the 1976 COESA U.S. standard lower atmospheric values for absolute temperature, pressure, density, and speed of sound for the input geopotential altitude. The COESA atmosphere model defines six layers from sea level to 71 km and uses equations adopted in 1976 by COESA to determine the temperature, pressure and density at any altitude. The equations and parameters are documented in a book entitled *U.S. Standard Atmosphere,* 1976 published by the U.S. Government Printing Office, Washington, D.C.

In the illustrative embodiment, the Non-Standard Day 310 atmosphere model 223 and Non-Standard Day 210C atmosphere model 224 implement the data set forth in military standards MIL-HDBK-310 and MIL-STD-210C, respectively, for absolute temperature, pressure, density, and speed of sound for the input geopotential altitude. The military standards MIL-HDBK-310 and MIL-STD-210C include regional climate data in addition to the world wide data, in which the land areas of the world could be divided into 4 regional types of climate based on temperature differences. The military standards MIL-HDBK-310 and MIL-STD-210C provide long-term climate extremes that are expected to occur at least once, for a short duration, during 10, 30, or 60 years of exposure. The extremes in the standard MIL-HDBK-310 replace the extremes in the standard MIL-STD-210C. The standards MIL-HDBK-310 and MIL-STD-210C also provide consistent vertical profiles of temperature and density up to 80 km based on extremes at 5, 10, 20, 30 and 40 km. The input of the models is geopotential height and the four outputs are temperature, speed of sound, air pressure, and air density. The military standards MIL-HDBK-310 and MIL-STD-210C are illustrative standards for the embodiment of non-standard day atmosphere models. One of skill in the art will appreciate that the non-standard day atmosphere models are not limited to the military standards MIL-HDBK-310 and MIL-STD-210C, and rather includes any specification describing an atmosphere other than the standard atmosphere.

The COESA atmosphere model 222, Non-Standard Day 310 atmosphere model 223 and Non-Standard Day 310 atmosphere model 224 are tied together by a dotted line 225 to indicate that the three models are provided together in a user interface and one of the models can be selected by the user. The user interface is described below in more detail with reference to FIG. 4A.

Figure 2C:
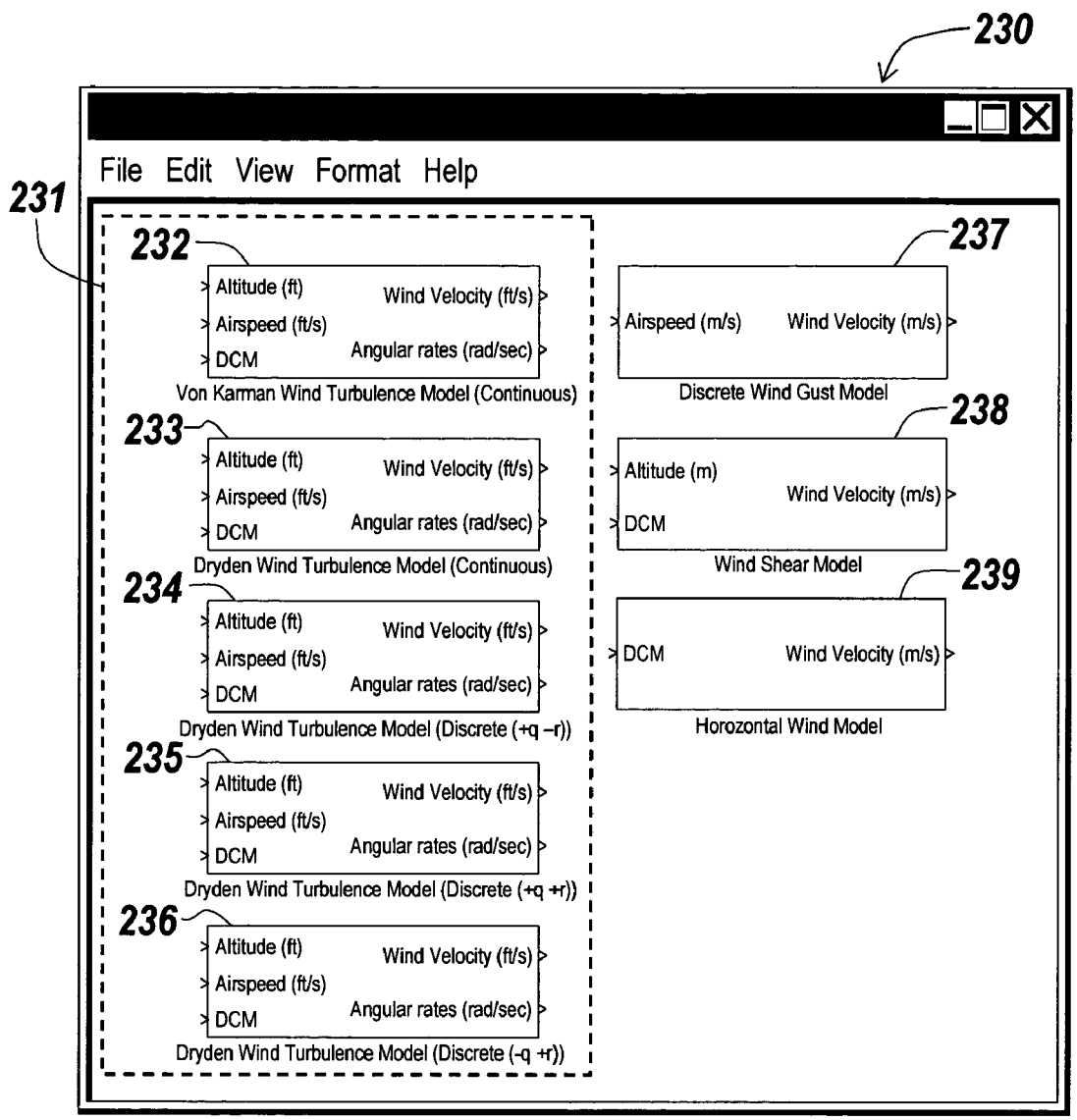
FIG. 2C is an exemplary computer display showing the wind models provided from the model storage depicted in FIG. 1A.

FIG. 2C is an exemplary computer display 230 showing the wind models belonging to the category of the planetary environment models 211 depicted in the illustrative embodiment of the present invention. The wind models are represented by blocks in the illustrative embodiment of the present invention. Each block of the wind models has an external port or ports that can be of input or output type. One of skill in the art will appreciate that the wind models can be represented by any other symbols or icons. The wind models include wind turbulence models 231, a wind gust model 237, a wind shear model 238 and a horizontal wind model 239. The illustrative embodiment of the present invention provides multiple wind turbulence models 231 including continuous Von Kármán wind turbulence model 232, continuous Dryden wind turbulence model 233 and discrete Dryden wind turbulence models 234 through 236. The multiple wind turbulence models 232 through 236 are tied together by a dotted line 231 to indicate that the wind turbulence models 232 through 236 are provided to users in a user interface that displays an option to select one of the wind turbulence models 232 through 236 tied together. The user interface is described in more detail with reference to FIG. 4B.

The wind models of the illustrative embodiment of the present invention implement the mathematical representation in the military specifications MIL-F-8785C and MIL-STD-1797 which contain the requirements for the flying and ground handling quality of military aerospace and aeronautic systems. The specifications are intended to assure flying qualities for the adequate mission performance and flight safety regardless of the design implementation or flight control system augmentation. The specifications MIL-F-8785C and MIL-STD-1797 provide atmospheric turbulence forms including Von Kármán form and Dryden form, discrete wind gust form and wind shear form. The specification MIL-STD-1797 additionally provides the digital filter implementation of the Dryden turbulence components. Turbulence can be considered as a stochastic process defined by velocity spectra. The military specifications use the continuous Von Kármán turbulence model and when the use of the continuous Von Kármán turbulence model is not feasible, the Dryden wind turbulence model is allowed to be used. The wind turbulence models 232 through 236 use the Dryden spectral representation to add turbulence to the aerospace or aeronautic model by passing band-limited white noise through appropriate forming filters. One of skill in the art will appreciate that the wind turbulence models are not limited to the military specifications MIL-F-8785C and MIL-STD-1797, and rather includes any continuous and discrete wind turbulence models.

Figure 2D:
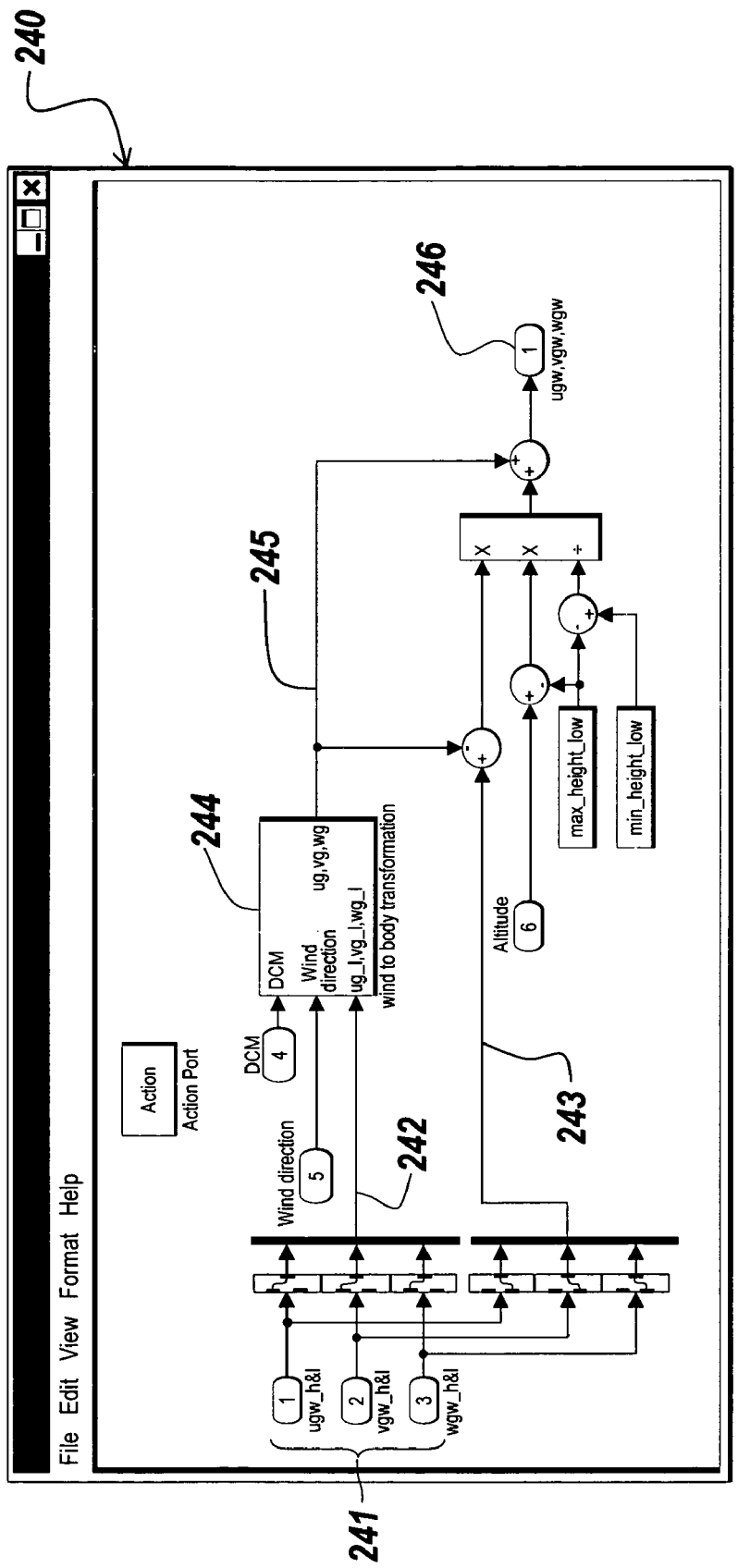
FIG. 2D is a computer display view showing an exemplary block diagram for interpolating wind velocity in the transitional region.

The wind turbulence models 231 of the illustrative embodiment of the present invention implement both the low and medium/high altitude models from the military specifications MIL-F-8587C and MIL-HDBK-1797. The low and medium/high altitudes are defined as altitudes below 1000 feet and above 2000 feet, respectively. The wind turbulence models 231 of the illustrative embodiment of the present invention provide wind turbulence models for the transition region between the low and medium/high altitudes, i.e. an altitude above 1000 feet and below 2000 feet, which is not defined within the military specification MIL-F-8587C and MIL-HDBK-1797. In order to provide a turbulence model that is continuous in altitude, a transition method is required to determine the values for the wind turbulence models in the transition region. A transition method can consist of linearly interpolating between the values of the wind turbulence models at the boundary altitudes, that is, 1000 feet and 2000 feet. For example, the turbulence velocities and turbulence angular rates are determined by the specifications provides in the military specification MIL-F-8587C and MIL-HDBK-1797 at the altitudes of 1000 feet and 2000 feet. The values for the wind turbulence model in the transition region are generated by linearly interpolating between the value from the low altitude model at 1000 feet transformed from mean horizontal wind coordinates to body coordinates and the value from the high altitude model at 2000 feet in body coordinates. Users can choose stability coordinate systems instead of the body coordinates. One of skill in the art will appreciate that the coordinate system of the region may be implemented in other coordinates, such as earth coordinates. FIG. 2D is a computer display view 240 showing an exemplary block diagram for interpolating wind velocity in the transitional region. The signal 241 is a bus signal that contains both the medium/high velocity 243 and low altitude velocity 242. The low altitude velocity 242 is applied to a wind to body transformation block 244 to transform the wind coordinates of the low velocity 242 to body coordinates. The velocity 246 in the transition region is generated by linearly interpolating between the transformed low velocity 245 and the medium/high velocity 243. This method also applies to the angular rates. One of skill in the art will appreciate that the transition region and transition method are not limited to a single region and method.

Figure 2E:
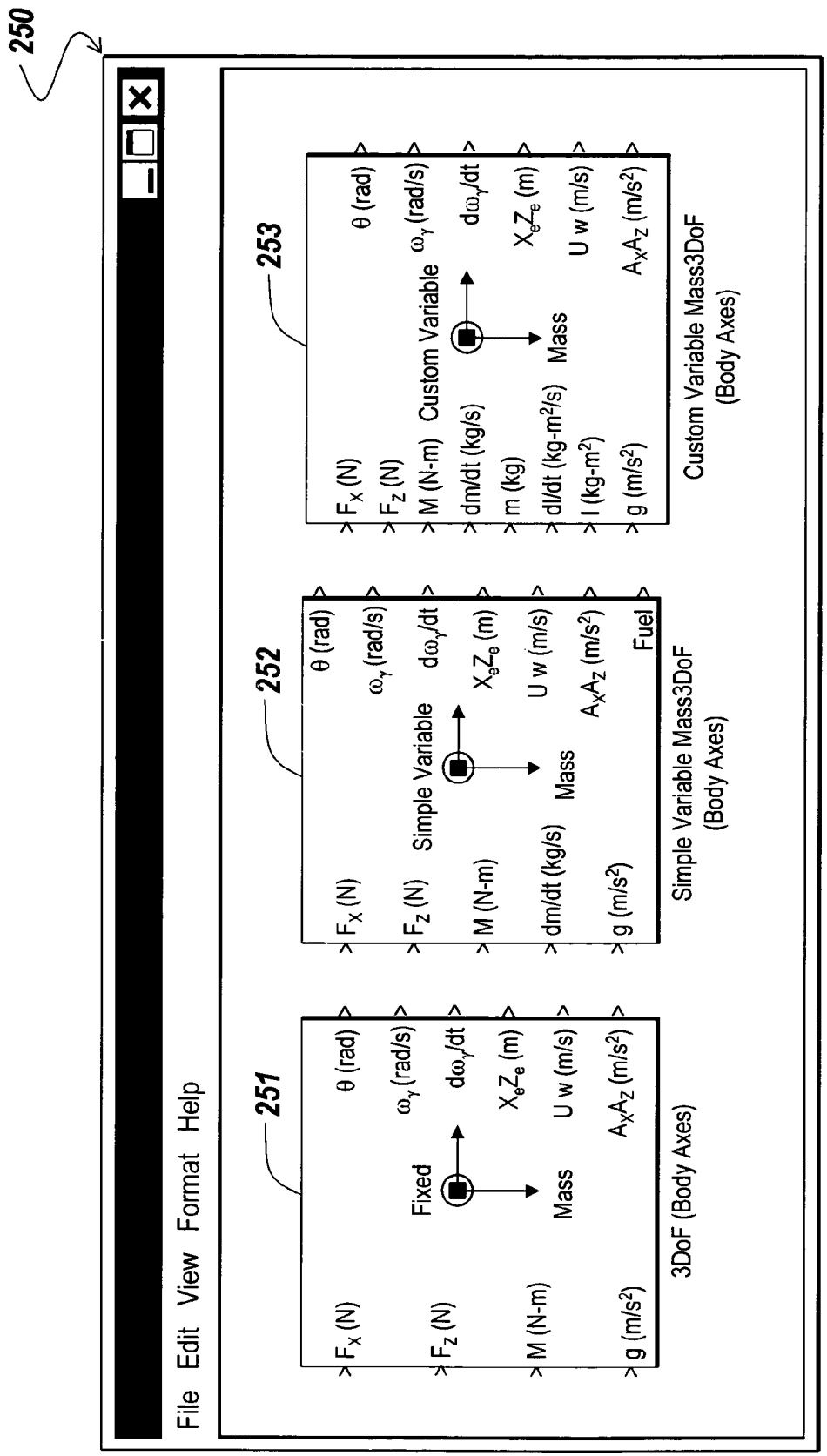
FIG. 2E is an exemplary computer display showing the models of three-degree-of-freedom (3DoF) equations of motion provided from the model storage depicted in FIG. 1A.

FIG. 2E is an exemplary computer display 250 showing the models for three-degree-of-freedom (3DoF) that belong to the equations of motion 212 depicted in FIG. 2A of the illustrative embodiment of the present invention. The 3DoF models are represented by blocks in the illustrative embodiment of the present invention. Each block of the 3DoF models has external ports that can be of input or output type. One of skill in the art will appreciate that the 3DoF models can be represented by any other symbols or icons. The 3DoF models include a Fixed Mass 3DoF in Body Axes model 251, a Simple Variable Mass 3DoF in Body Axes model 252 and a Custom Variable Mass 3DoF in Body Axes model 253. The 3DoF models 251 through 253 implement three-degree-of-freedom equations of motion in body axes. One of skill in the art will appreciate that the 3DoF models 251 through 253 may be implemented within other axes, such as wind axes. The 3DoF models 251 through 253 are also implemented with different types of mass including fixed mass, simple variable mass and custom variable mass. The mass does not change in the type of the fixed mass. The mass changes via a mass rate in the simple variable mass. In the custom variable mass, users may specify in detail how the mass changes and other parameters that are closely dependent on the mass change. The illustrative embodiment of the present invention provides multiple 3DoF models 251 through 253 including Variable Mass 3DoF models 252-253. The multiple 3DoF models 251-253 are provided to users in a user interface that displays an option to select one of the 3DoF models 251 through 253. The user interface is described in more detail with reference to FIG. 4C.

Figure 2F:
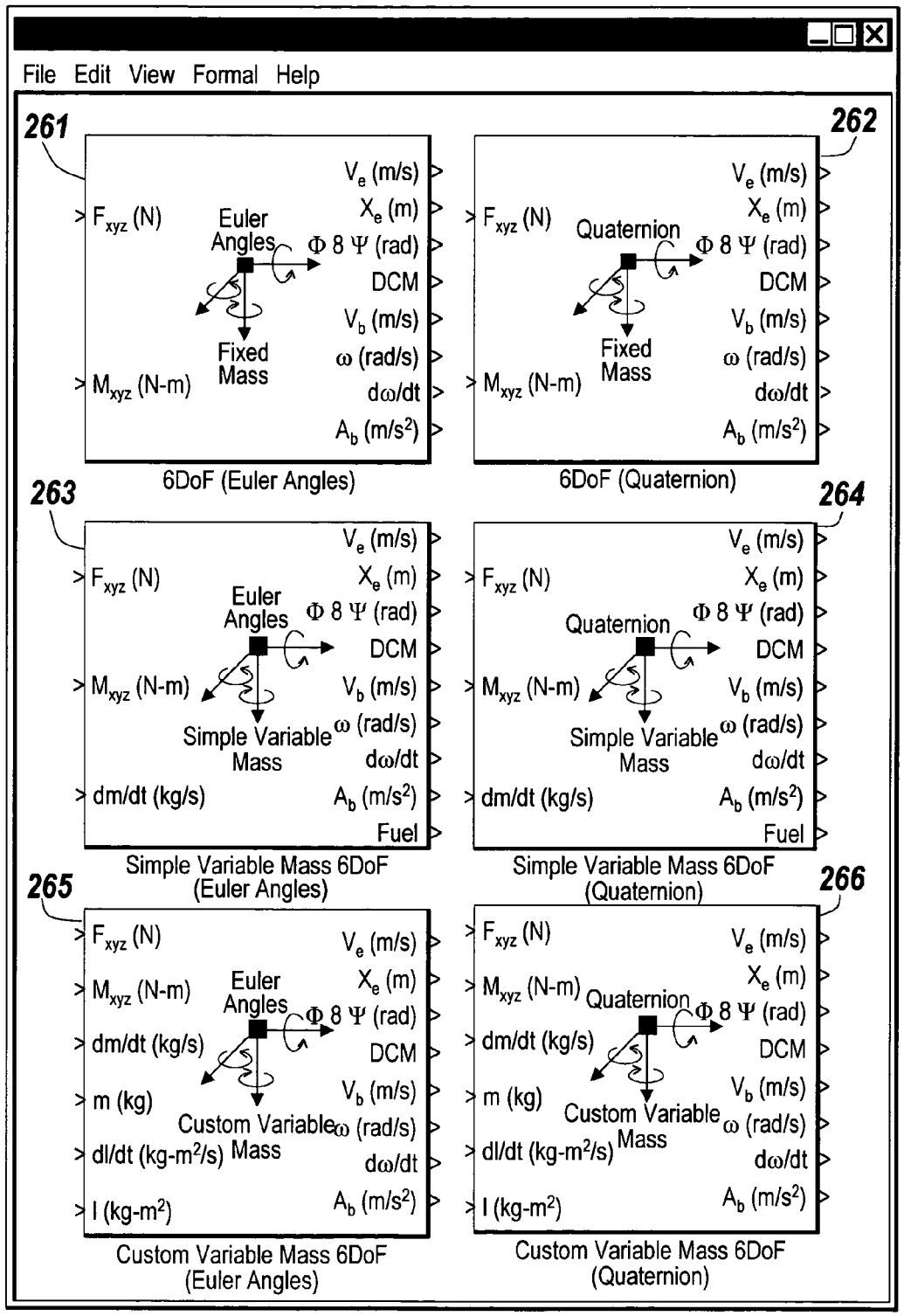
FIG. 2F is an exemplary computer display showing the models of six-degree-of-freedom (6DoF) equations of motion provided from the model storage depicted in FIG. 1A.

FIG. 2F is an exemplary computer display 260 showing the models for six-degree-of-freedom (6DoF) equations of motion that belong to the equations of motion block 212 depicted in FIG. 2A of the illustrative embodiment of the present invention. The 6DoF models are represented by blocks in the illustrative embodiment of the present invention. Each block of the 6DOF models has external ports that can be of input or output type. One of skill in the art will appreciate that the 6DoF models can be represented by any other symbols or icons. The 6DoF models include a Fixed Mass 6DoF using Euler Angles 261 and Fixed Mass 6DoF using Quaternion 262. The 6DoF models also include a Simple Variable Mass 6DoF using Euler Angles 263 and a Simple Variable Mass 6DoF using Quaternion 264. The 6DoF models further include a Custom Variable Mass 6DoF using Euler Angles 265 and a Custom Variable Mass 6DoF using Quaternion 266. The 6DoF models using Euler Angles 261, 263 and 265 implement an Euler Angle representation of six-degrees-of-freedom equations of motion. The 6DoF models using Quaternion 262, 264 and 266 implement a quaternion representation of six-degrees-of-freedom equations of motion. The 6DoF models 261 through 266 implement six-degree-of-freedom equations of motion within body axes. One of skill in the art will appreciate that the 6DoF models 261 through 266 may be implemented within other axes, such as wind axes. The 6DoF models 261 through 266 also implement different types of mass including fixed mass, simple variable mass and custom variable mass. The mass does not change in the type of the fixed mass. The mass changes via a mass rate in the simple variable mass type. In the type of custom variable mass, users may specify in detail how the mass changes and other parameters that are closely dependent on the mass change. The illustrative embodiment of the present invention provides multiple 6DoF models 261-266 including Variable Mass 6DoF models 263-266. The multiple 6DoF models 261-266 are provided to users in a user interface that displays an option to select one of the 6DoF models 261 through 266. The user interface is described in more detail with reference to FIGS. 4D and 4F.

Figure 3A:
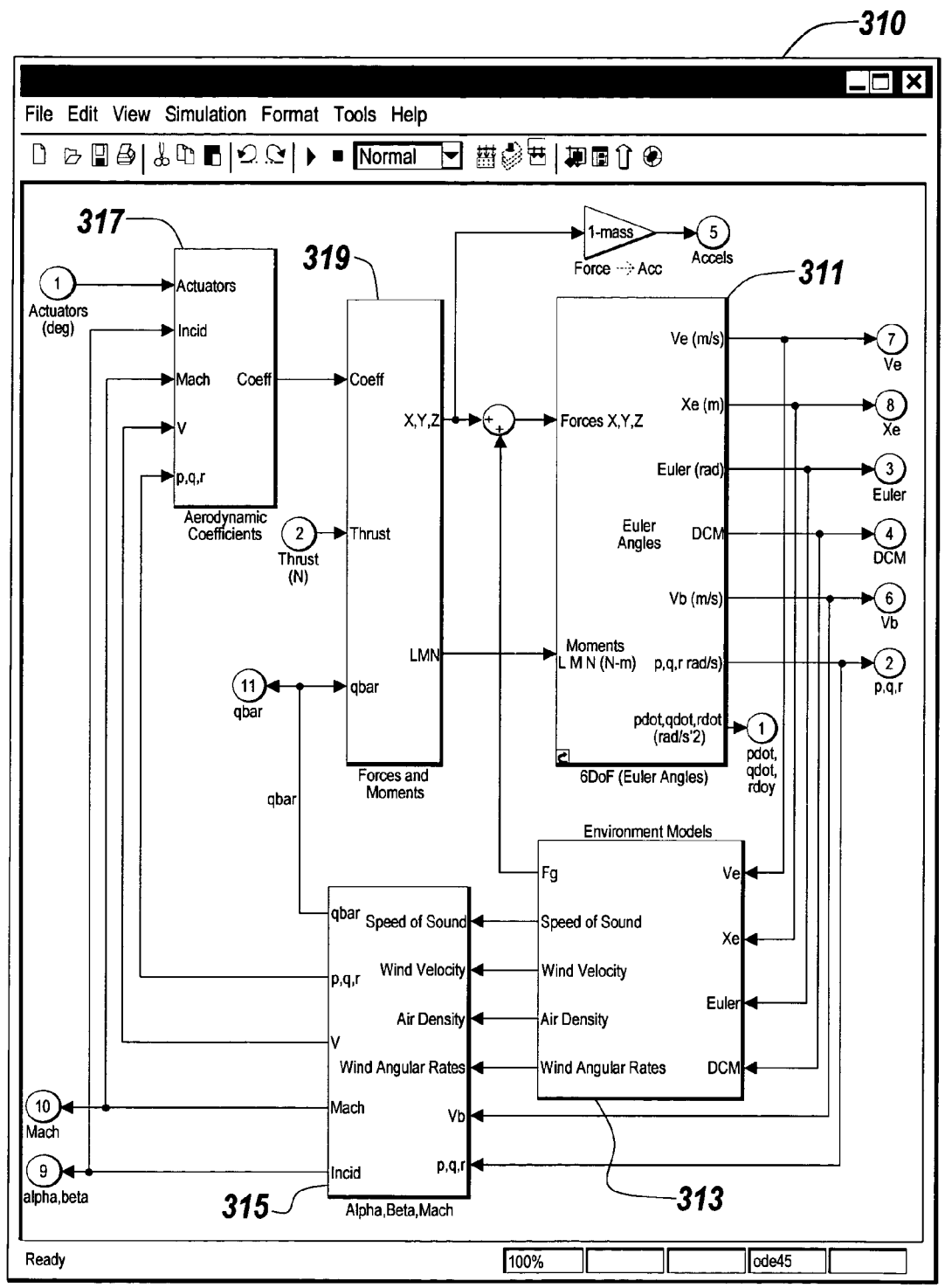
FIG. 3A is a computer display showing an exemplary block diagram of an aerospace or aeronautic system implemented in the illustrative embodiment of the present invention.

FIG. 3A is a computer display 310 showing a block diagram of an exemplary aerospace and aeronautic system implemented in the illustrative embodiment of the present invention. A complete block diagram of the aerospace and aeronautic system may be provided from the model storage 110 and customized by users in the design unit 120 to a particular aerospace and aeronautic system. The block diagram of the aerospace and aeronautic system can also be drawn by the users in the design unit 120 using the models in the model storage 110. The block diagram shown in FIG. 3A is illustrative and can be varied depending on the aerospace and aeronautic system.

The aerospace and aeronautic system shown in FIG. 3A is a typical aerospace and aeronautic system that includes a number of components, such as a model 311 for equations of motion (3DoF or 6DoF), an planetary environment model 313, an aerodynamics model including a model 315 for pre-calculation, a coefficient calculation model 317 and force and moment calculation model 319. If users select the planetary environment model 313 by, for example, clicking on the block of the planetary environment model 313, a detailed block diagram of the planetary environment model 313 is displayed in another window, such as a pop-up window. Clicking the block of the planetary environment model 313 is an illustrative way to select the planetary environment model 313. One of skill in the art will appreciate that the planetary environment model 313 can be selected by another way.

Figure 3B:
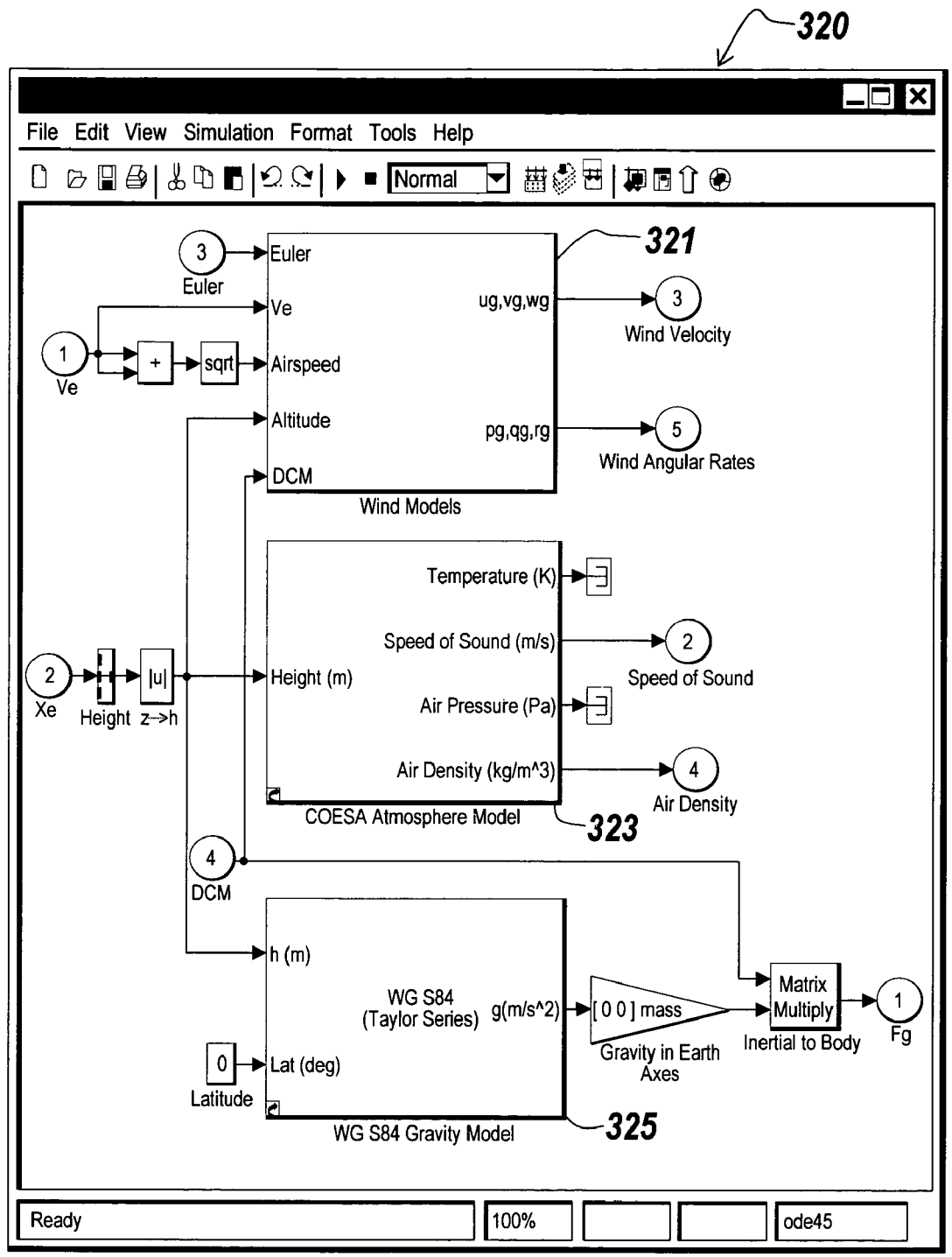
FIG. 3B is a computer display showing an exemplary block diagram of the planetary environment model incorporated into the aerospace or aeronautic system depicted in FIG. 3A.

FIG. 3B is an illustrative computer display 320 showing a detailed block diagram of the planetary environment model 313 depicted in FIG. 3A. The planetary environment model 313 includes a wind model 321, an atmosphere model 323 and a gravity model 325. The detailed block diagram of the planetary environment model 313 shown in FIG. 3B is an illustrative embodiment of the present invention and can be varied depending on the structure of the aerospace and aeronautic system.

Figure 4A:
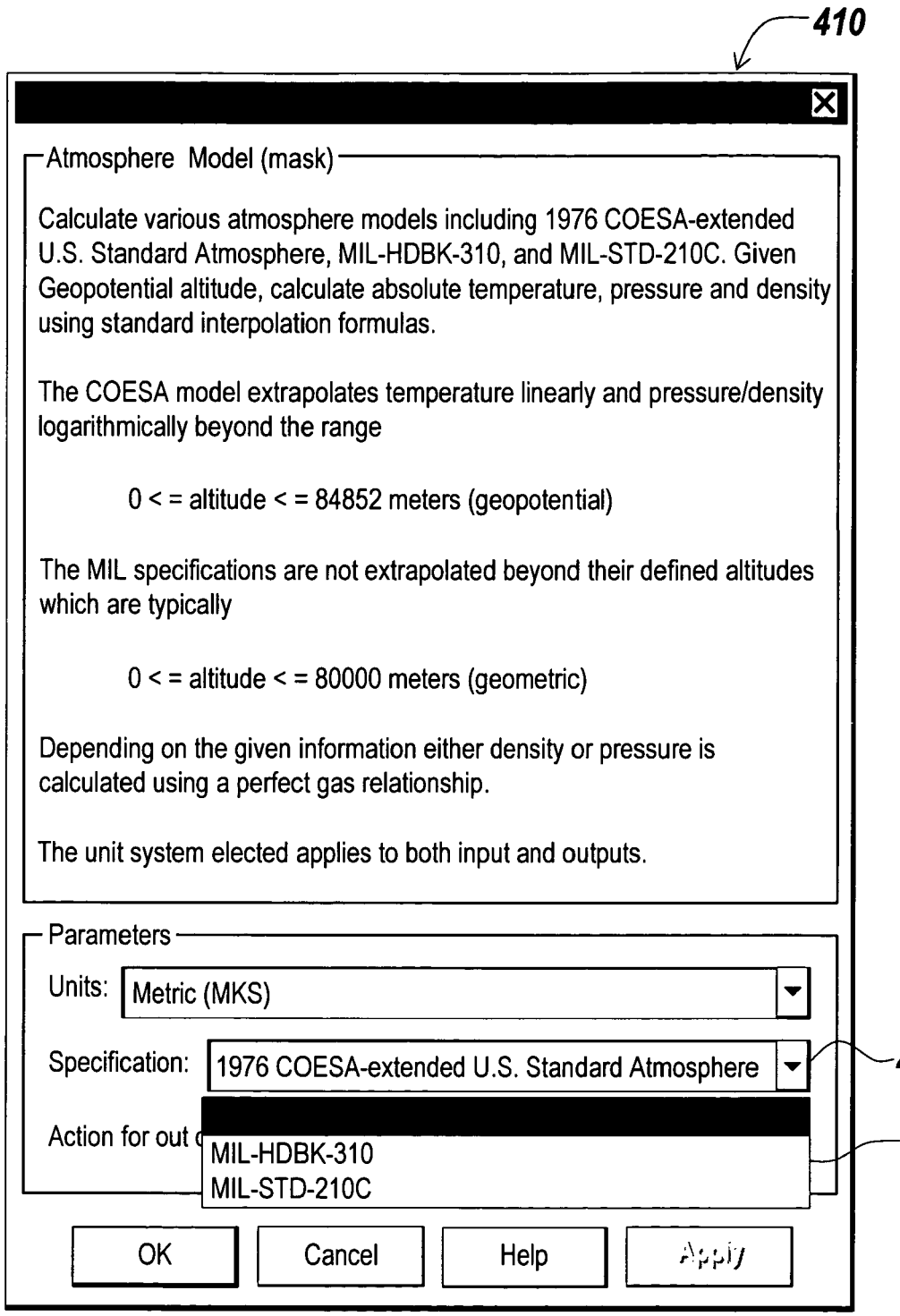
FIG. 4A is a computer display showing an exemplary graphical user interface provided in response to the clicking of the atmosphere model depicted in FIG. 3B.

If users click on the block of the atmosphere model 323, a user interface is provided for entering parameters of the atmosphere model 323. The user interface is displayed besides or over the block 323 in the same window. One of skill in the art will appreciate that the user interface can be provided in a different manner, such as being provided in a separate pop-up window. FIG. 4A is a computer display showing an illustrative graphical user interface 410 provided in response to the clicking of the atmosphere model 323 depicted in FIG. 3B. The graphical user interface 410 provides two sections. One of the sections describes the atmosphere model incorporated into the aerospace and aeronautic system and the other section enters parameters of the atmosphere model which include units and specification. The graphical user interface 410 shown in FIG. 4A is illustrative and one of skill in the art will appreciate that other types of user interfaces can be provided to enter parameters of the atmosphere models, such as textual user interfaces. The graphical user interface 410 provides menus to select units and specifications, respectively. If the users click the button of the units, the users can select units between metric and English units, for example. If the user clicks the button 411 of the specification, the graphical user interface 410 provides atmosphere models that are provided from the model storage 110. The models provided in the menu 413 includes 1976 COESA U.S. Standard Atmosphere, MIL-HDBK 310 and MIL-STD-210C, which corresponds to the atmosphere models tied together by dotted line 222 in FIG. 2B. The atmosphere models provided in the menu 413 may be extended by users so that users may add to the menu 413 another atmosphere model. If the users select one of the atmosphere models provided at the menu 413, the selected model is incorporated from the model storage 110 into the aerospace and aeronautic system that the user designs and executes. The menu 413 shown in FIG. 4A is illustrative and one of skill in the art will appreciate that the units and specifications can be selected in a different manner.

Figure 3C:
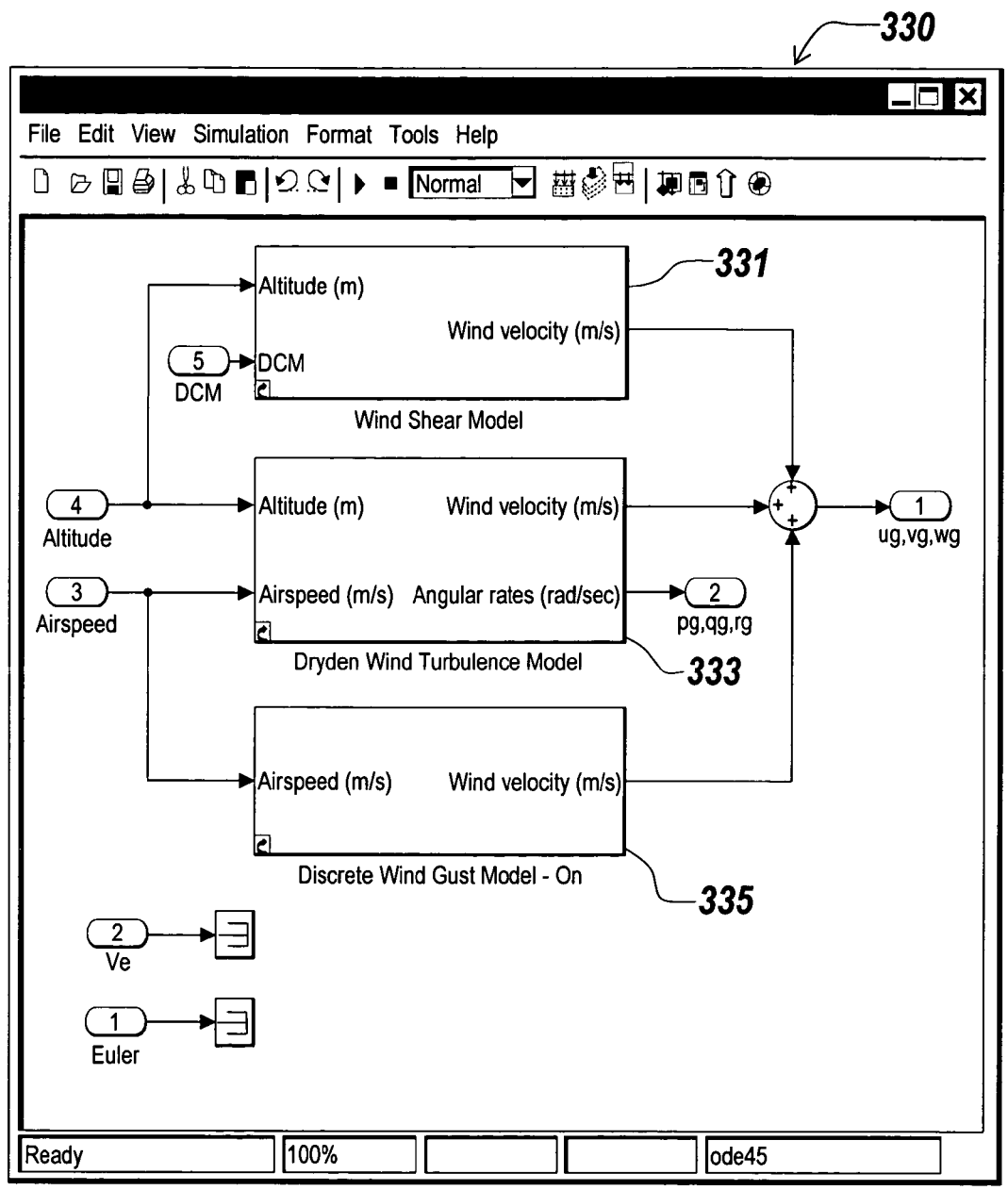
FIG. 3C is a computer display showing an exemplary block diagram of the wind model depicted in FIG. 3B.

If users select the wind model 321 by, for example, clicking on the block of the wind model 313, a detailed block diagram of the wind model 321 is displayed in a window, such as a pop-up window. FIG. 3C is an illustrative computer display 330 showing a detailed block diagram of the wind model 321 depicted in FIG. 3B. The wind model 321 in the illustrative embodiment of the present invention includes a wind shear model 331, a wind turbulence model 333 and a wind gust model 335. One of skill in the art will appreciate that the wind model can have various types of block diagrams and includes more or less models, such as background wind models, depending on the structure of the aerospace and aeronautic system.

Figure 4B:
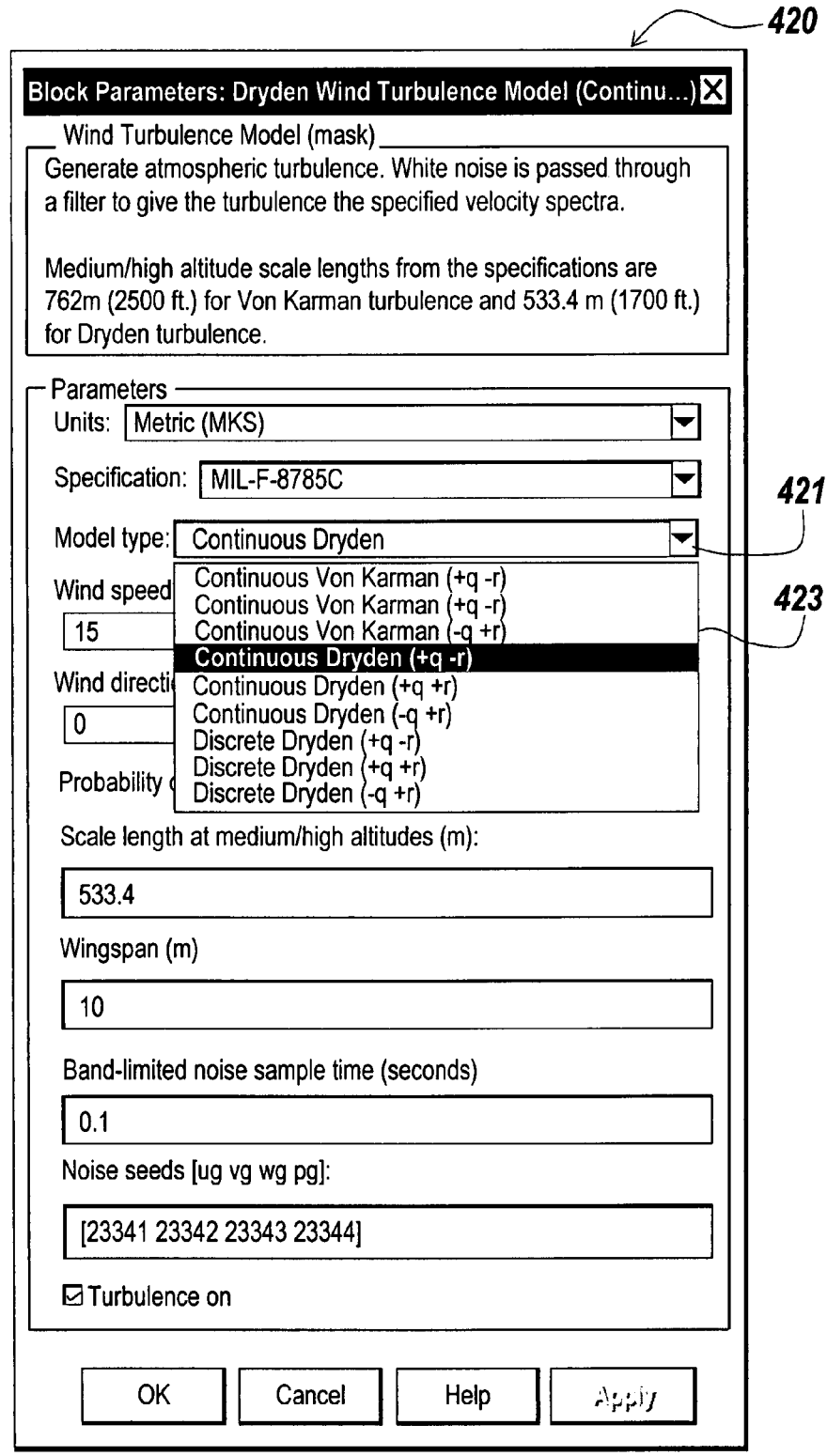
FIG. 4B is a computer display showing an exemplary graphical user interface provided in response to the clicking of the wind turbulence model depicted in FIG. 3C.

If users click on the wind turbulence model 331, a user interface is provided besides or over the block of the wind turbulence model 331 for entering parameters of the wind turbulence model. One of skill in the art will appreciate that the user interface can be provided in a different manner, such as being provided in a separate window. FIG. 4B shows an illustrative computer display of the graphical user interface 420 provided in response to the users' clicking of the wind turbulence model 331 depicted in FIG. 3C. The graphical user interface 420 provides blanks for entering parameters including model type, units, wind speed, wind direction, etc. In order to enter the model type, the graphical user interface provides a menu 423 in response to clicking a button 421. The menu includes the wind turbulence models that are provided from the model storage. The wind turbulence models provided in the menu 423 includes continuous Von Kármán, continuous Dryden and discrete Dryden, which correspond to the wind turbulence models tied together by the dotted line 231 in FIG. 2C. The wind turbulence models provided in the menu 423 may be extended by users so that users may add to the menu 423 another wind turbulence model. If the user select of the wind turbulence models provided at the menu 423, the selected wind turbulence model is incorporated from the model storage 110 into the aerospace and aeronautic system the users design and execute.

Figure 4D:
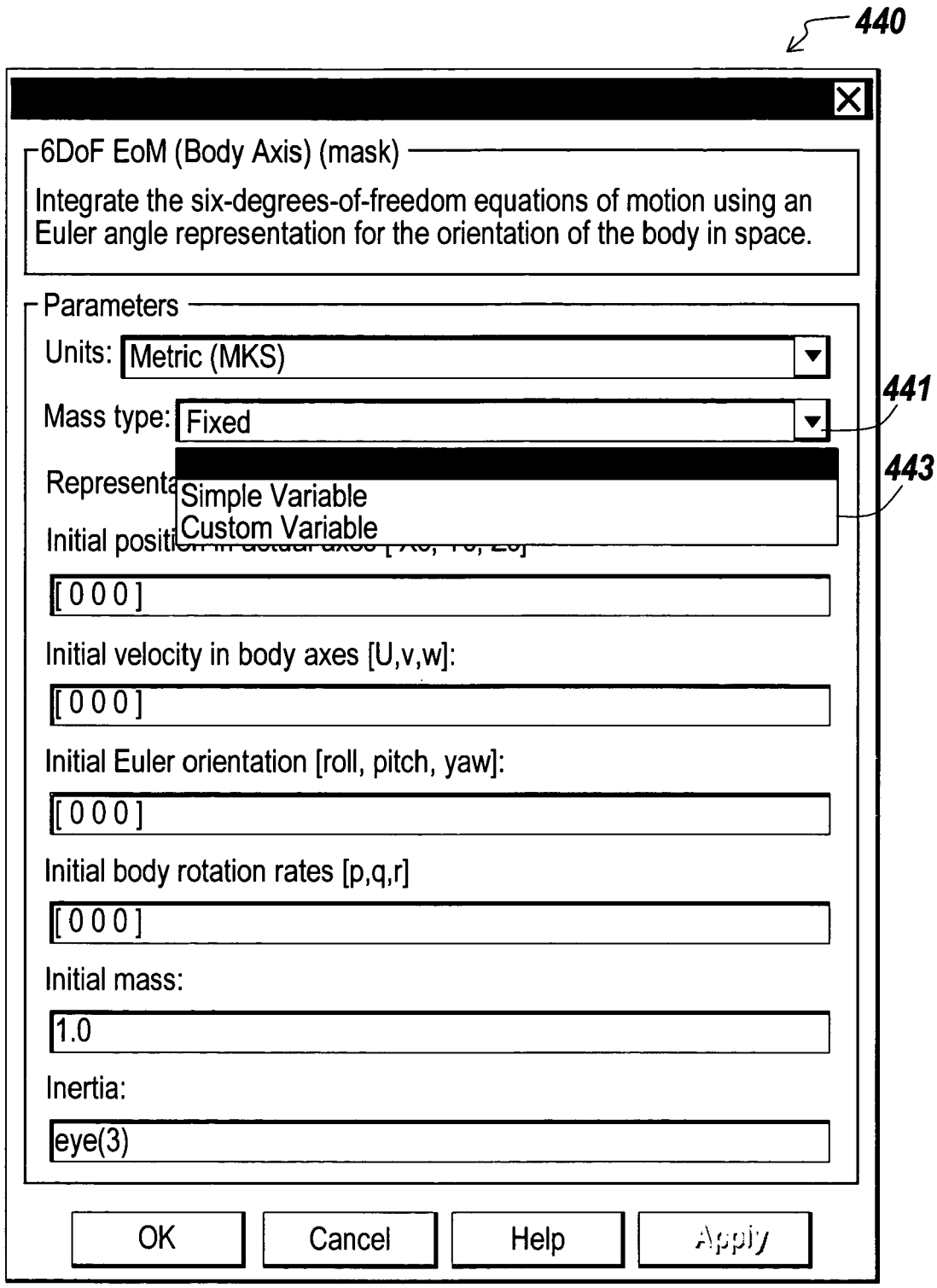

If users click on the model 311 for equations of motion that represents 6DoF, a user interface is provided for entering parameters of the 6DoF model. FIGS. 4D and 4E shows an illustrative computer display of the graphical user interface 440 provided in response to the users' clicking of the 6DoF model 311 depicted in FIG. 3A. The graphical user interface 440 provides blanks for entering parameters including units, mass type, presentation, etc. In order to enter the mass type, the graphical user interface provides a menu 443 in response to clicking a button 441. The menu includes the fixed, simple variable and custom variable types. In FIG. 4E, in order to enter the representation, the graphical user interface 450 provides a menu 453 in response to clicking a button 451. The combination of the mass type and the representation provide the 6DoF models depicted in FIG. 2F. The 6DoF models provided by the combination of the mass type and the representation in the menus 443 and 453 may be extended by users so that users may add to the menus 443 and 453 another 6DoF model. If the user selects a 6DoF models provided at the menus 443 and 453, the selected 6DoF model is incorporated from the model storage 110 into the aerospace and aeronautic system that the users design and execute.

Assuming that the model 311 represents a 3DoF model instead of a 6DoF model, a user interface is provided for entering the parameters of the 3DoF model as shown in FIG. 4C. FIG. 4C is an illustrative computer display of the graphical user interface 430 provided for entering the parameters of the 3DoF model depicted in FIG. 2E. The graphical user interface 430 provides blanks for entering parameters including units, mass type, etc. In order to enter the mass type, the graphical user interface provides a menu 433 in response to clicking a button 431. The menu includes the fixed, simple variable and custom variable types, which correspond to the 3DoF models depicted in FIG. 2E. The mass does not change in the fixed mass. The mass changes via a mass rate in the simple variable mass. In the custom variable mass, users may specify in detail how the mass changes and other parameters that are closely dependent on the mass change. The 3DoF models provided in the menu 433 may be extended by users so that users may add to the menu 433 another 3DoF model. If the user select of the 3DoF models provided at the menu 433, the selected 3DoF model is incorporated from the model storage 110 into the aerospace and aeronautic system that the users design and execute.

Upon selecting the desired component model from one of the user interfaces depicted in FIGS. 4A through 4E, the corresponding functionality of the desired component model can be included in the symbol representing the models in a number of ways: (i) one of a selection of pre-built components models can be copied or referred to in the symbol, (ii) the desired functionality can be included by conditionally evaluating part of a component model, and (iii) a sequence of component model modifications can be executed to arrive at the desired functionality. The first method represents a standard mechanism used in computer modeling and simulation packages such as Simulink.

The second method is illustrated, in the preferred embodiment, by exploiting a programming language which conditionally executes code with the desired functionality in the following code snippet:

```
switch (type){
  case COESA:
  /* call COESA calculations */
  CalcAtmosCOESA(alt,T,P,rho,SoS,k);
  break;
  case MILHDBK310:
  {/* call MIL-HDBK-310 particular model */
  switch (model){
    case PROFILE:
      CalcAtmosProfile310(alt,t_tab,dens_tab,T,P,rho,
        SoS,k);
      break;
    ease ENVELOPE:
      CalcAtmosEnvelope310(alt,alt_tab,temp_tab,dens_tab,pres_tab, T,P,rho,SoS,k);
      break;
    default:
      ssSetErrorStatus(S, Mmsg);
      goto EXIT_POINT;
    }
  }
  break;
  case MILSTD210C:
  {/* call MIL-STD-210C particular model */
```

```
switch (model){
   case PROFILE:
      CalcAtmosProfile210c(alt,temp_tab,dens_tab,T,P,
         rho,SoS,k);
      break;
   case ENVELOPE:
      CalcAtmosEnvelope210c(alt,alt_tab,temp_tab,den-
         s_tab,pres_tab, T,P,rho,SoS,k,udata);
      break;
   default:
      ssSetErrorStatus(S, Mmsg);
      goto EXIT_POINT;
   }
}
   break;
default:
   ssSetErrorStatus(S, Smsg);
   goto EXIT_POINT;
}
```

Here the C code is partitioned to allow executing one of the available behaviors. To this end, the available functionality is embodied by conditionally executed code, in the example it is guarded by a case statement. When the model component is evaluated, an indexing scheme is exploited to ensure the desired functionality as selected by the user is executed. Another embodiment would be to use native Simulink blocks to conditionally execute portions of the model.

Figure 5A:
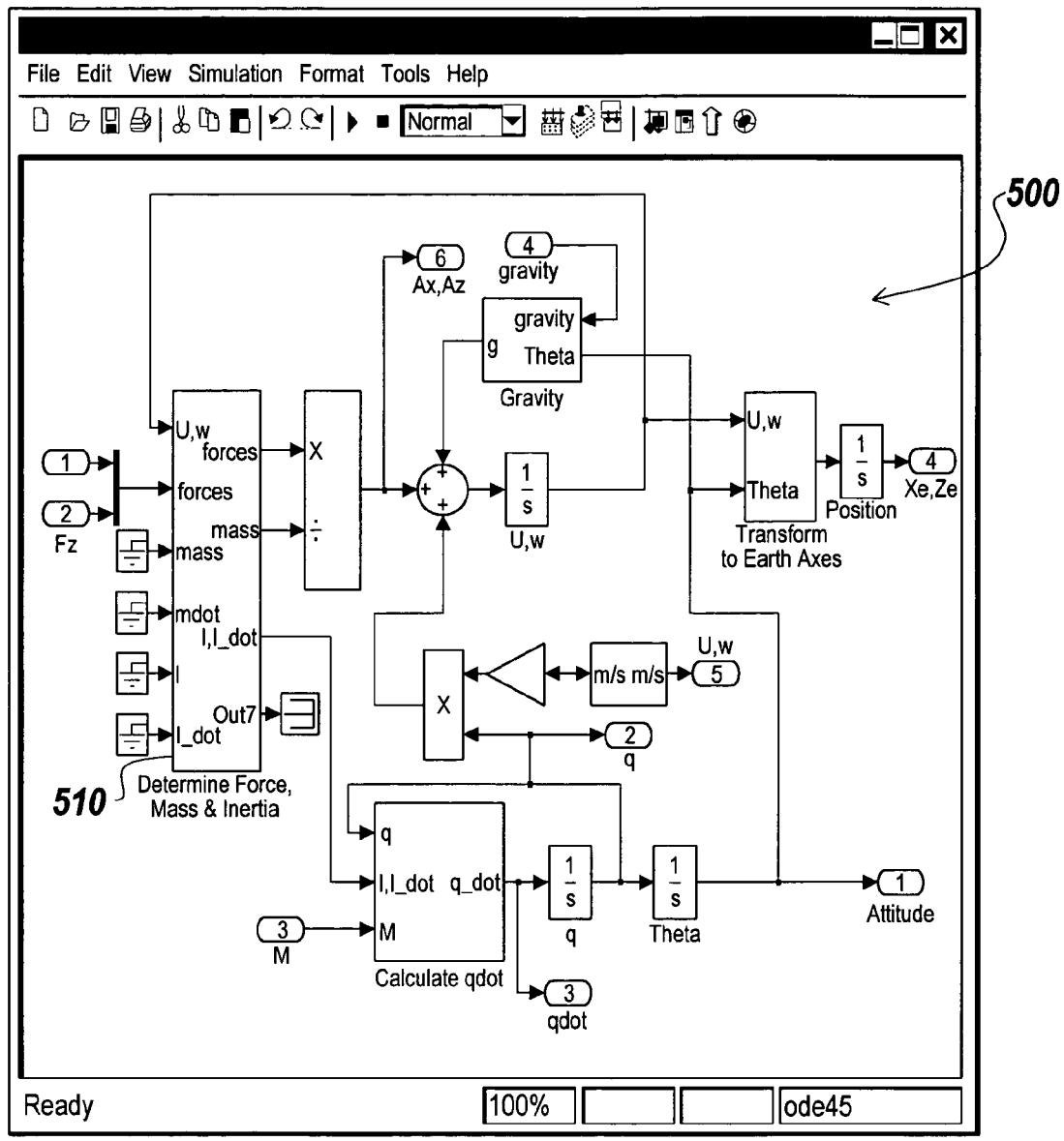
FIG. 5A is a computer display showing an exemplary block diagram of the three-degree-of-freedom (3DoF) equations of motion model in body axes depicted in FIG. 2E.
Figure 5B:
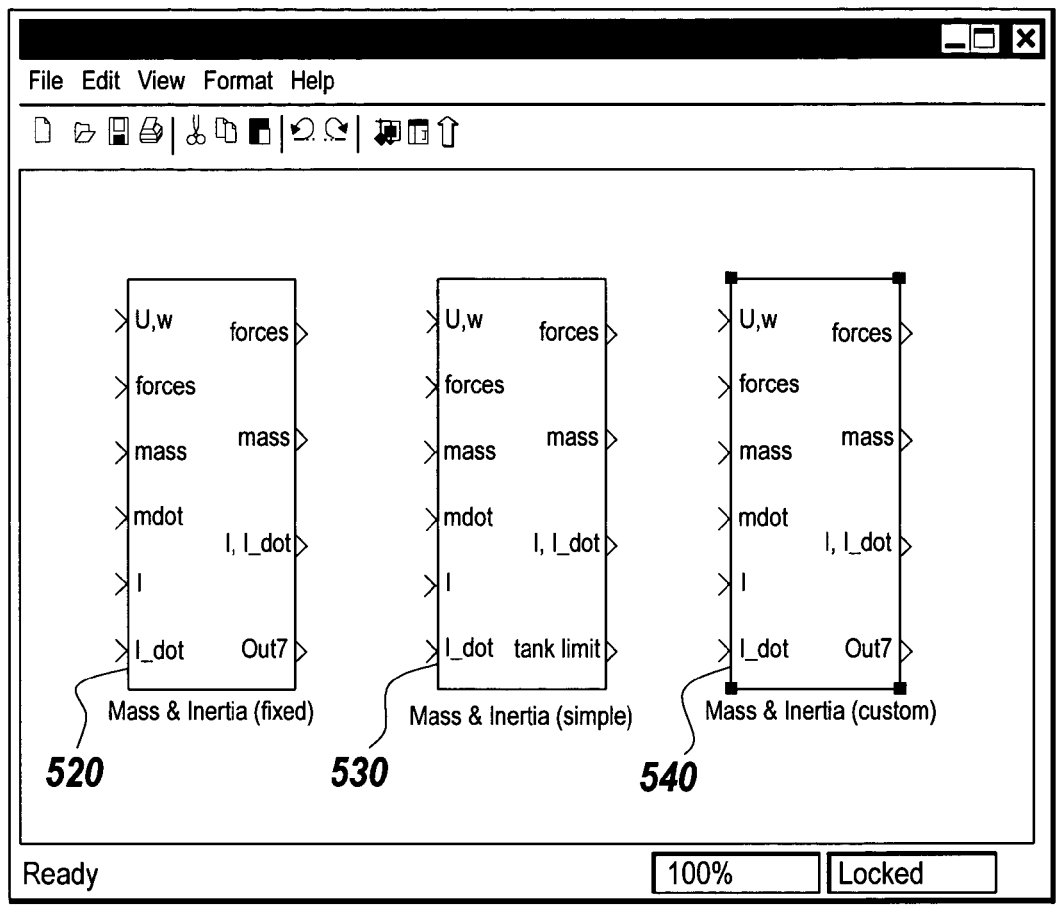
FIG. 5B shows the replacement blocks for the Determine Force, Mass, & Inertia block depicted in FIG. 5A.
Figure 5C:
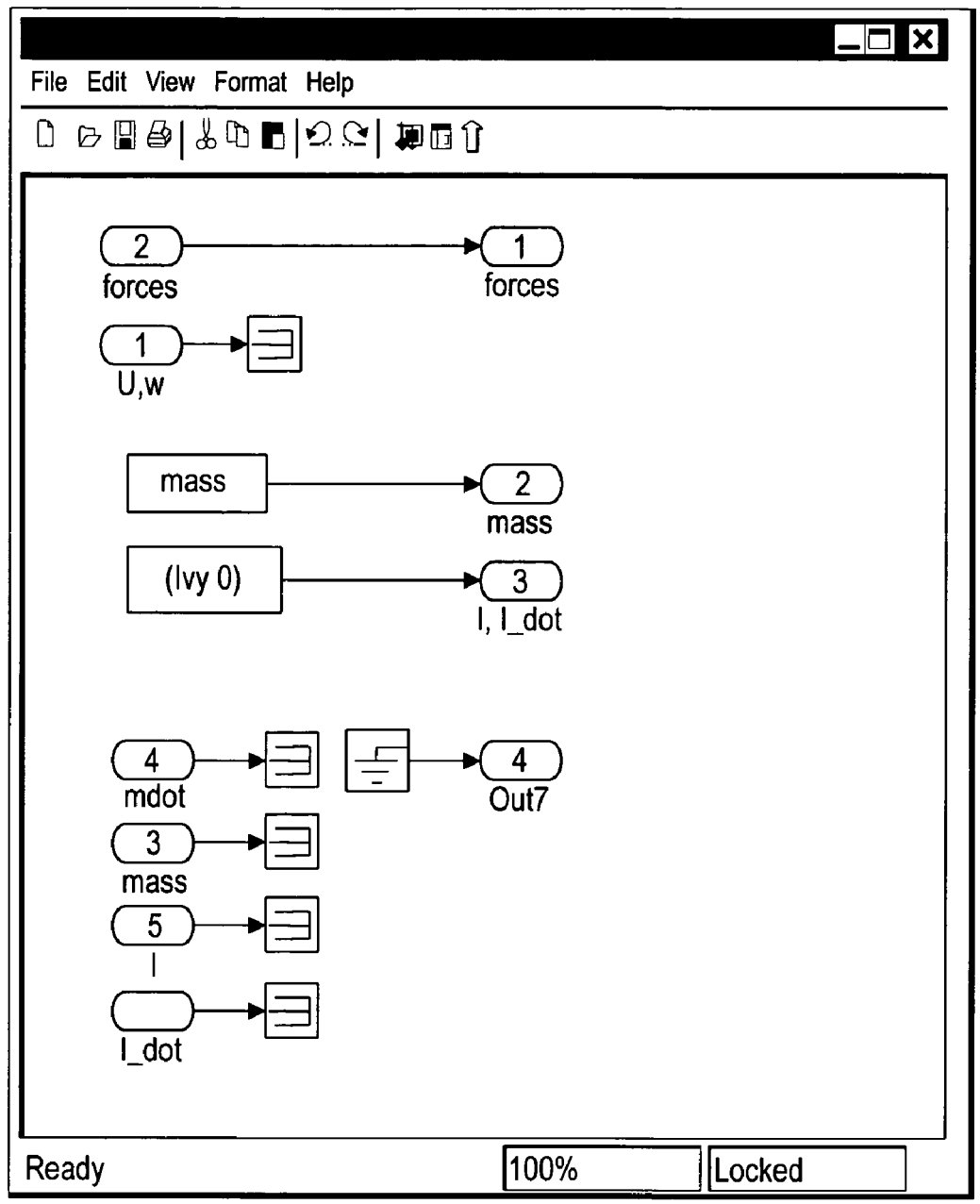
FIGS. 5C-5E show illustrative block diagrams for the replacement blocks that correspond to the fixed mass version, the simple variable mass version and the custom variable mass version of Determine Force, Mass, & Inertia block.
Figure 5D:
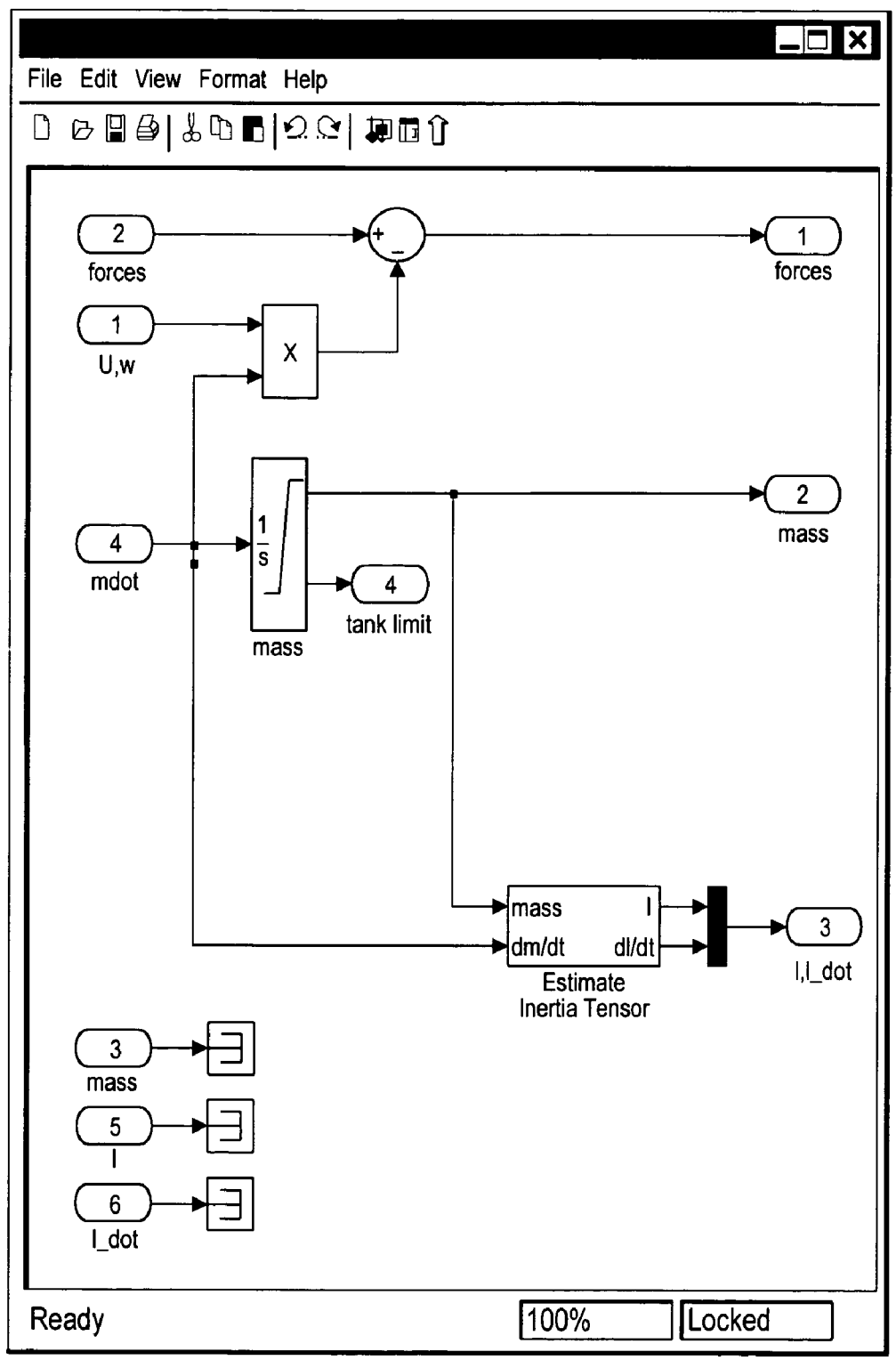
Figure 5E:
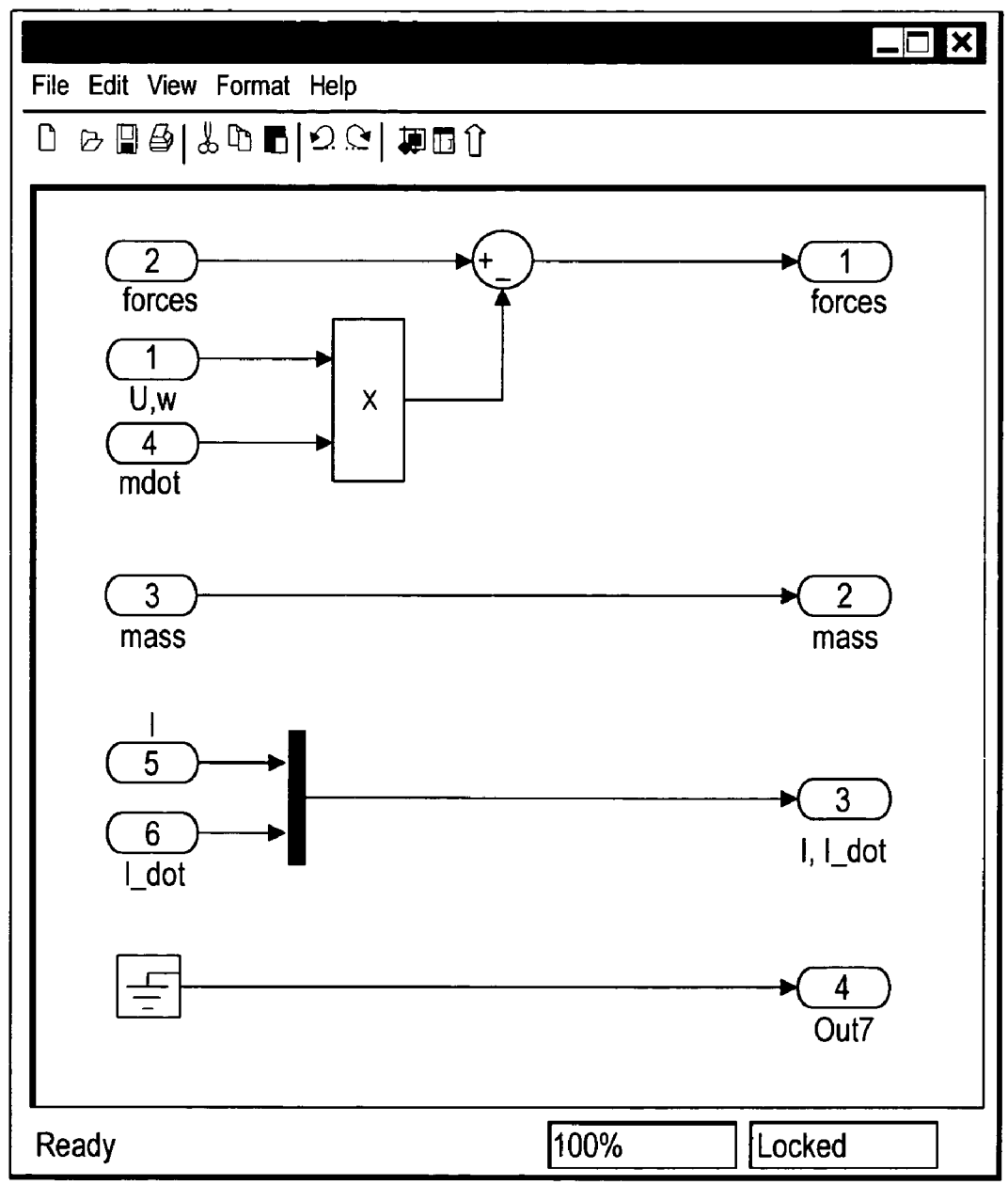

In the third approach, a component model can be dynamically modified in response to selections from the user interface. In the preferred embodiment, a scripting language is exploited that, e.g., adds, removes, changes parameters, and connects blocks together to comprise the desired functionality. This is illustrated in FIGS. 5A through 5E. FIG. 5A shows an illustrative block diagram 500 of the three-degree-of-freedom (3DoF) equations of motion model in body axes depicted in FIG. 2E. The block diagram 500 includes a Determine Force, Mass, & Inertia block 510 for determining the force, mass, and inertia of the body. FIG. 5B shows the "replacement blocks" 520-540 for the Determine Force, Mass, & Inertia block 510 depicted in FIG. 5A. FIGS. 5C-5E show illustrative block diagrams for the replacement blocks 520-540 that correspond to the fixed mass version, the simple variable mass version and the custom variable mass version of Determine Force, Mass, & Inertia block 510, respectively, The following script commands modify a Fixed Mass 3DoF in Body Axes model to a Custom Variable Mass 3DoF in Body Axes model in response to the user selecting a Custom Variable Mass 3DoF in Body Axes component model:

function updatemodel(blk)

% get model type from user interface tmode=get_param(blk,'mtype');

switch tmode

% replace how force, inertia and mass calculations take place for 3DoF

% depending on user interface
   case 'Fixed'
   replaceblock([blk sprintf('/Determine Force, \nMass & Inertia')], . . . 'Mass & Inertia (fixed)','aerolib3dofsys');
   case 'Simple Variable'
   replaceblock([blk sprintf('/Determine Force, \nMass & Inertia')], . . . 'Mass & Inertia (simple)', 'aerolib3dofsys');
   case 'Custom Variable'
   replaceblock([blk sprintf('/Determine Force, \nMass & Inertia')], . . . 'Mass & Inertia (custom)', 'aerolib3dofsys');
   otherwise
   error('aeroblks:aeroblk3dofbody:invalidtype','mass type not defined');

end return

The user interfaces depicted in FIGS. 4A through 4E may also be applied to display an option to select one of the models provided for other aerospace and aeronautic component, such as actuators 215 and propulsion 214 models. For example, the user interface may be used to enable users to change a currently incorporated actuator model to another actuator model, or to change a currently incorporated propulsion model to another propulsion model. In these applications, the models provided in the user interface for the users to select may be extended by the users so that the users may add models to the user interface.

In summary, the illustrative embodiment of the present invention provides software tools for the system level design and execution of aerospace and aeronautic systems. The illustrative embodiment of the present invention provides multiple atmosphere models, including standard atmosphere models and non-standard day atmosphere models, multiple wind turbulence models, or multiple equations of motion models. The illustrative embodiment of the present invention also provides graphical user interfaces in response to users' action for selecting a model from the multiple atmosphere models, wind turbulence models, or equations of motion models. The graphical user interface enables users to change the atmosphere model, wind turbulence model, equations of motion model to another atmosphere model, wind turbulence model or equations of motion model. The illustrative embodiment of the present invention therefore designs and executes an aerospace and aeronautic system more accurately and conveniently than conventional tools.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any other model storage, such as a model storage that provides multiple models for the design and execution of an aerospace and aeronautic system. Practitioners of the art will realize that the sequence of steps and architectures depicted in the figures may be altered without departing from the scope of the present invention and that the illustrations contained herein are singular examples of a multitude of possible depictions of the present invention.

I claim:

1. A computer-implemented method for modeling a target system, the method comprising:
   identifying a first block that represents multiple component models in a block diagram model of a target system;
   displaying a user interface in response to a first user action, the first user action indicating a selection of the first block, the user interface including a mechanism that provides the user with the multiple component models;
   receiving a user selection that selects a first component model from the multiple component models;
   incorporating the first component model into the model of the target system using the first block;

saving the model of the target system that includes the first component model in a memory; and switching the first block to represent a second component model in response to a second user action indicating a selection of second component model in the user interface, without replacing the first block with a second block representing the second component model.

2. The method of claim 1 wherein the component models belong to a category of atmosphere models that include at least a non standard day atmosphere model.

3. The method of claim 1 wherein the component models belong to a category of wind turbulence models that include at least a discrete turbulence model.

4. The method of claim 1 wherein the component models belong to a category of equations of motion models that include at least one simple variable mass model and at least one custom variable mass model.

5. The method of claim 1 wherein component models provided as options of the user interface may be extended by a user.

6. The method of claim 1 wherein after the second component model is selected in the user interface, the second component model is incorporated into the model of the target system through the first block.

7. The method of claim 1 wherein the first component model has a same configuration of external ports that can be of input or output type as the second component model.

8. The method of claim 1 wherein the first component model has a different configuration of external ports that can be of input or output type as the second component model.

9. The method of claim 1 wherein the first block represents one of the first component model and the second component model depending on a user's selection of the first component model and the second component model.

10. A computer-implemented method for modeling a target system, the method comprising:
    identifying a first block that represents multiple component models in a block diagram model of a target system;
    displaying a user interface in response to a user action indicating a selection of the first block, the user interface including a mechanism that provides the user with the multiple component models; and
    receiving a user selection that selects a first component model from the multiple component models;
    incorporating the first component model into the model of the target system using the block;
    saving the model of the target system that includes the first component model in a memory;
    switching the first block to represent a second component model in response to a user action indicating a selection of the second component model in the user interface; and
    incorporating the second component model into the model of the target system by one of
        copying or referring to the second component model in the block,
        conditionally evaluating at least a part of the component model, or
        executing a sequence of modifications to the component model.

11. The method of claim 10 wherein the component models belong to a category of atmosphere models that include at least a non standard day atmosphere model.

12. The method of claim 10 wherein the component models belong to a category of wind turbulence models that include at least a discrete turbulence model.

13. The method of claim 10 wherein the component models belong to a category of equations of motion models that include at least one simple variable mass model and at least one custom variable mass model.

14. The method of claim 10 wherein component models provided as options of the user interface may be extended by a user.

15. The method of claim 10 wherein after the second component is selected in the user interface, the second component model is incorporated into the model of the target system through the first block.

16. The method of claim 10 wherein the first component model has a same configuration of external ports that can be of input or output type as the second component model.

17. The method of claim 10 wherein the first component model has a different configuration of external ports that can be of input or output type as the second component model.

18. The method of claim 10 wherein the first block represents one of the first component model and the second component model depending on a user's selection of the first component model and the second component model.

19. The method of claim 10 wherein the first component model is switched to the second component model without replacing the first block by a second block representing the second component model.

* * * * *